(12) United States Patent
Wu et al.

(10) Patent No.: US 7,689,483 B2
(45) Date of Patent: Mar. 30, 2010

(54) SYSTEM TO FACILITATE PAYMENTS FOR A CUSTOMER THROUGH A FOREIGN BANK, SOFTWARE, BUSINESS METHODS, AND OTHER RELATED METHODS

(75) Inventors: Jingyan Wu, Kingwood, TX (US); Lee M. Tankersley, Houston, TX (US); Laura Garcia, Houston, TX (US); Juan G. Castellano, Houston, TX (US); Russell L. Root, Coppell, TX (US); Mark H. Friedman, Missouri City, TX (US); Laszlo E. Popeszku, Tomball, TX (US); David C. Farries, The Woodlands, TX (US); Walter Scott Horton, Tomball, TX (US); Chinh Tran, Houston, TX (US)

(73) Assignee: Amegy Bank of Texas, Houston, TX (US)

( * ) Notice: Subject to any disclaimer, the term of this patent is extended or adjusted under 35 U.S.C. 154(b) by 1929 days.

(21) Appl. No.: 10/441,987

(22) Filed: May 20, 2003

(65) Prior Publication Data

US 2004/0236646 A1    Nov. 25, 2004

(51) Int. Cl.
   *G06Q 40/00*    (2006.01)
(52) U.S. Cl. .......................................... 705/35; 705/38
(58) Field of Classification Search .................. 705/35
   See application file for complete search history.

(56) References Cited

U.S. PATENT DOCUMENTS 5,508,913 A    4/1996    Yamamoto et al.
5,787,402 A    7/1998    Potter et al.
5,825,003 A    10/1998   Jennings et al.
6,269,345 B1   7/2001    Ribound
6,289,252 B1   9/2001    Wilson et al.
7,269,575 B1*  9/2007    Concannon et al. ........... 705/39
7,610,233 B1*  10/2009   Leong et al. .................. 705/37
2001/0034682 A1  10/2001  Knight et al.
2001/0056398 A1* 12/2001  Scheirer ...................... 705/38
2002/0016762 A1  2/2002   Feilbogen et al.
2002/0087455 A1* 7/2002   Tsagarakis et al. ............ 705/37
2002/0152156 A1  10/2002  Tyson-Quah (Continued)

FOREIGN PATENT DOCUMENTS

WO    WO 00/36571    6/2000

(Continued)

*Primary Examiner*—James P Trammell
*Assistant Examiner*—John A Anderson
(74) *Attorney, Agent, or Firm*—Bracewell & Giuliani LLP

(57) ABSTRACT

A system for facilitating payment of accounts payables from a foreign financial institution for a customer of a domestic financial institution, software, and methods are provided. The system includes a first financial institution computer positioned at a domestic financial institution site to define a domestic financial institution server, having memory associated therewith, and foreign exchange analyzing software stored in the memory of the domestic financial institution server to analyze a foreign exchange transaction. The system also includes an area network in communication with the server, and a second customer computer in communication with the area network, positioned remote from the server at a customer site, and positioned to transmit an accounts payable batch data file having a plurality of accounts payable to the foreign exchange analyzing software stored on the server.

14 Claims, 12 Drawing Sheets

U.S. PATENT DOCUMENTS

| | | | |
|---|---|---|---|
| 2003/0033212 A1* | 2/2003 | Sandhu et al. | 705/26 |
| 2003/0069754 A1 | 4/2003 | Weeks, Jr. et al. | |
| 2003/0070080 A1* | 4/2003 | Rosen | 713/187 |
| 2003/0110128 A1* | 6/2003 | Foth et al. | 705/40 |
| 2003/0208440 A1* | 11/2003 | Harada et al. | 705/39 |
| 2004/0006540 A2* | 1/2004 | Paglin | 705/42 |

FOREIGN PATENT DOCUMENTS

| | | |
|---|---|---|
| WO | WO 01/20508 A2 | 3/2001 |
| WO | WO 01/61663 | 8/2001 |
| WO | WO 01/84276 A2 | 11/2001 |
| WO | WO 01/93170 A1 | 12/2001 |
| WO | WO 03/012714 A1 | 2/2003 |

* cited by examiner

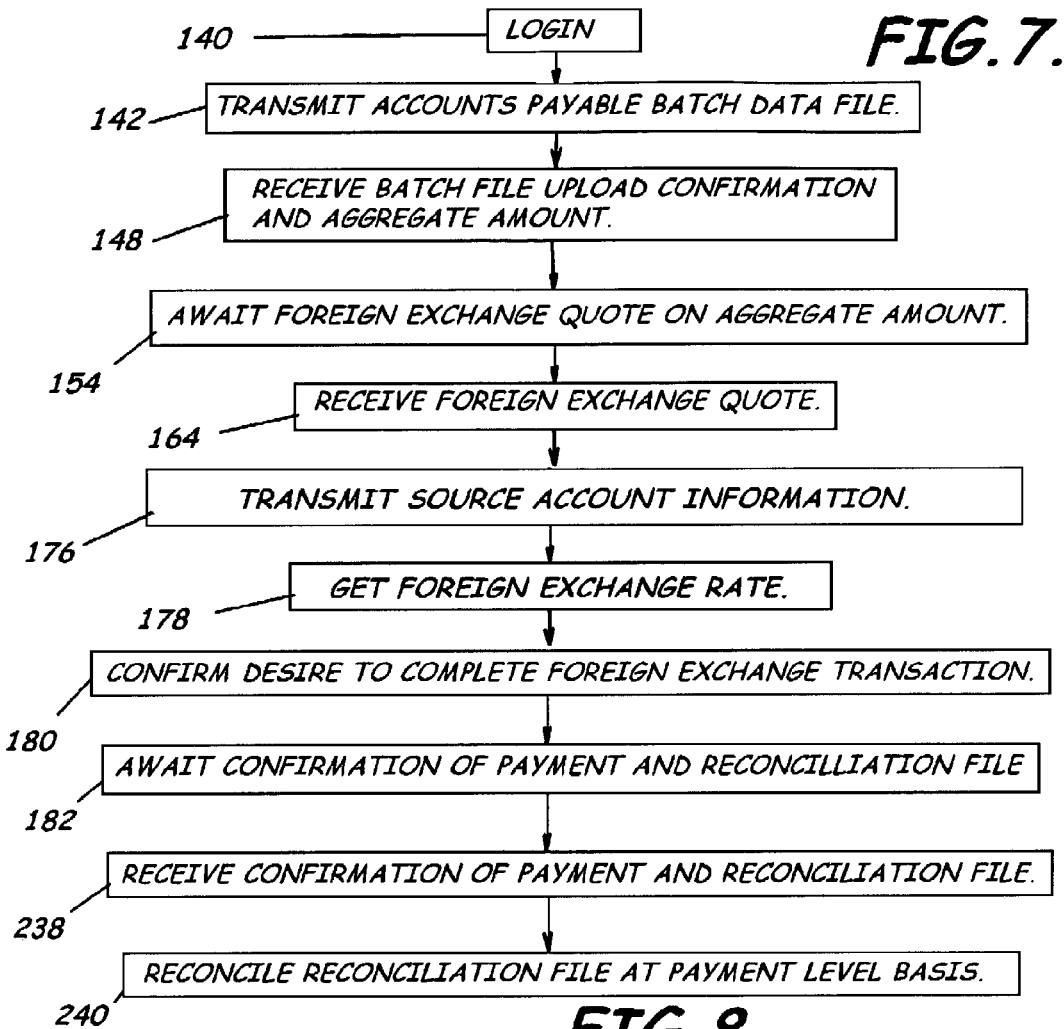

Upload Batch File

Provide File Details Below

Drive Letters
[Select One ▽]

File Name
[BatchFile1.bit ▽]

[Enter] [Cancel] [Browse]

Batch File Upload Confirmation

Batch File Upload Confirmation #-------------

You will receive an email (ex. customer@company.com) with details on your Foreign Exchange requirements.

FIG. 10.

SYSTEM TO FACILITATE PAYMENTS FOR A CUSTOMER THROUGH A FOREIGN BANK, SOFTWARE, BUSINESS METHODS, AND OTHER RELATED METHODS

BACKGROUND OF THE INVENTION

1. Field of the Invention

The present invention relates generally to the foreign exchange financial industry. In more specific aspects, the present invention relates to account payment systems, software, and methods.

2. Description of the Related Art

International payment transactions frequently involve transferring money from a domestic account to the account of the payee. In a typical international payment transaction, a bank customer initially places an order at a local bank holding the customer's account. The local bank then typically contacts a domestic financial institution having a direct relationship with another financial institution in the destination country to prosecute the transfer. This results in a chain of financial institutions being involved in the transaction, causing added expense and delay, and may involve a significant foreign currency risk. This expense can be excessive where a customer has frequent need for transferring funds to various foreign accounts.

Some modern systems have tried to solve these difficulties. For example, U.S. Pat. No. 5,825,003, by Jennings et al., titled "Customer-Directed, Automated Process for Transferring Funds Between Accounts Using A Holding Account And Local Process," describes a system which allows a user, through an ATM or computer terminal, to request a single transfer of funds from a source bank account to a second destination bank account in another country.

Also, for example, World Intellectual Property Organization ("WIPO") Publication No. 01/84276A2, by Harada et al., titled "International Payment System And Method" describes a system and method for moving funds from a source account in one country to a destination account held in another country and bypassing the traditional SWIFT international settlement system. As described in this patent document, a customer first enrolls for the service, obtains a configured account within the system, and receives a unique customer identification number. The system includes a graphical user interface ("GUI") that includes input fields for entering destination payee information which is stored in the system database and related to the customer's identification number. To prosecute an order, the customer logs on and provides transaction parameters including payee, dollar amount of transaction, type of currency for making payments and the source customer account for making a payment. When the transaction involves a transfer to a single payee, the system receives a spot rate for the currency, determines additional fees and final exchange rate, and provides the total for the transaction. The customer must approve the transaction to initiate payment. The system sends payment instructions independently of the actual money transfer in order to attempt to eliminate the need to execute a chain of credits and debits between correspondent financial institutions.

Bank customers having a frequent need to transfer funds to cover accounts payables, however, often desire a more business oriented system with a focus on obtaining an optimum exchange rate with minimal foreign currency risk. Foreign exchange rates, however, are highly variable, and numerous factors influence the exchange rates, such as economic strength of countries, political stability, countries' transnational policies and relationships, demand for foreign currency, and, of course, the size of the transaction. Due to high variability and numerous factors influencing the exchange rates, it is extremely difficult to predict future exchange rates even for a short period. Where the bank customer requires frequent transfers of funds to various foreign accounts as when prosecuting the settlement of accounts payables, the bank customer often must either establish a foreign currency account or establish a foreign bank account in order to reduce foreign currency risk. The customer typically establishes either of the accounts with sufficient foreign currency funds to cover an estimated block of accounts payables.

Similar to prosecuting individual transactions described above, in settling the accounts payables, the customer typically delivers individual instructions and payment information to the local or foreign bank for each of the accounts payables. Where the customer utilizes a foreign currency account established in a local bank, the customer can face numerous bank transactional charges and other charges related to foreign exchange transactions and fees of an intermediary utilized to transfer the funds to the foreign payees. Where the customer utilizes a foreign bank account, the customer faces reduced foreign exchange transactional fees but can be saddled with increased foreign bank transactional fees and an increased foreign exchange currency risk.

The Applicants, however, have recognized that there still exists a need for reducing the number of cross-border flows in order to reduce the number of foreign exchange transactions and correspondingly reduce financial institution and intermediary charges with respect to the foreign exchange transaction. Also, Applicants have recognized there is still a need to minimize the amount of foreign currency required to be held in a foreign financial institution in order to settle a customer's accounts payables while retaining the ability for a customer to reconcile individual accounts payable transactions at the payment level, if desired.

SUMMARY OF THE INVENTION

In view of the foregoing, embodiments of the present invention advantageously provide a system, software, and methods which introduce discipline into the client's accounts payable payment system. Embodiments of the present invention also provide a system, software, and methods which allow a reasonable degree of certainty on settlements and help to improve cash flow forecasting through use of batch processing of a customer's accounts payables. Embodiments of the present invention also provide for lump sum foreign exchanges, rather than individual foreign exchanges for each individual payable, to reduce both foreign exchange and financial institution transaction fees. Embodiments of the present invention also provide for a foreign currency exchange to a foreign financial institution in an amount of foreign currency required only for a specific batch of accounts payables to reduce exchange rate exposure.

Note, the term "batch" as used herein refers to an aggregate or group of a plurality of individual accounts payables, and more particularly, being handled collectively as a group for transferring and receiving files, data, and funds, and for obtaining goals and executing foreign exchange transactions therein. The term "batch" does not mean a linear sequence but instead refers to simultaneous processing such as, for example, cooking a batch of cookies.

More particularly, a system for facilitating payment of accounts payables from a foreign financial institution for a customer of a domestic financial institution according to an embodiment of the present invention is provided which includes a first financial institution computer positioned at a domestic financial institution site to define a domestic financial institution server. The domestic financial institution server has a memory associated therewith. Foreign exchange analyzing software is stored in the memory of the domestic financial institution server to analyze a foreign exchange transaction. The system can also include an area network in communication with the server and a second customer computer in communication with the area network, positioned remote from the server at a customer site, and positioned to transmit the accounts payable batch data file to the foreign exchange analyzing software stored on the server. The system further can also include a foreign financial institution computer having foreign exchange accounts payable processing software, in communication with the area network, and positioned to process payments according to the accounts payable batch data file.

The foreign exchange analyzing software is adapted to communicate through an area network with a customer of the domestic financial institution to analyze a foreign exchange transaction. The foreign exchange analyzing software includes an accounts payable batch identifier positioned to tag an accounts payable batch data file having a plurality of individual accounts payables received from a customer with a batch data file identifier and a regulatory screener positioned to receive the tagged accounts payable batch data file, having a preselected regulatory criteria associated with a foreign financial transaction, and positioned to screen the accounts payable batch data file for any transactional data failing to meet the preselected regulatory criteria. The foreign exchange analyzing software also includes a foreign exchange transaction determiner positioned to receive the tagged accounts payable batch data file to determine an aggregate amount of foreign currency desired by the customer to pay an aggregate of the plurality of individual accounts payables in the accounts payable batch data file and to request a foreign exchange quote on the aggregate amount.

The foreign exchange analyzing software can further include a foreign exchange contract confirmer positioned to receive the foreign exchange quote on the aggregate amount. The foreign exchange contract confirmer is responsive to a foreign exchange quote and can confirm that the customer desires to complete a foreign exchange based on the foreign exchange quote. The foreign exchange analyzing software can further include a foreign exchange transaction transferor responsive to the foreign exchange contract confirmer to transfer foreign currency funds of a selected foreign currency into a nostro account associated with the foreign financial institution and to transfer the accounts payable batch data file to the foreign financial institution site for payment of the plurality of individual accounts payables with the aggregate amount of foreign currency.

The foreign exchange analyzing software can still further include a suspect record identifier positioned to compare the accounts payable batch data file prior to regulatory screening by the regulatory screener to a version of the accounts payable batch data file after regulatory screening by the regulatory screener. The comparison can be accomplished to identify and tag each suspect record within the accounts payable batch data file with a suspicious record identifier to track suspect record activity by the suspicious record identifier. Each of the plurality of individual accounts payables of the accounts payable batch data file can include an accounts payable record. The accounts payable batch data file preferably has a plurality of accounts payable records. One of the plurality of accounts payable records is screened from the accounts payable batch data file by the regulatory screener and identified as having transactional data failing to meet the preselected regulatory criteria of the regulatory screener to define a suspect transaction. The suspect transaction can be separated and withheld from the accounts payable batch data file to be transferred to the foreign financial institution computer.

Additionally, the foreign exchange analyzing software, in communication with a foreign exchange accounts payable processing software of a foreign financial institution computer through the area network, yet further can include a foreign exchange transaction auditor positioned to match the screened accounts payable batch data file aggregate amount with an amount of foreign currency funds transferred to the nostro account, positioned to match the screened accounts payable batch data file payment requirements with nostro account payment activity by the foreign financial institution, and positioned to compare the unscreened accounts payable batch data file payment requirements with nostro account payment activity by the foreign financial institution.

An embodiment of the present invention also advantageously provides foreign exchange analyzing software stored on a storage media for facilitating payments for a customer through a foreign financial institution using a batch payment process to analyze a foreign exchange transaction. The software includes a regulatory screener adapted to receive an accounts payable batch data file having a plurality of individual accounts payables received from a customer. The regulatory screener screens the accounts payable batch data file for any transactional data failing to meet a preselected regulatory criteria associated with a foreign financial transaction. The software also includes a foreign exchange transaction determiner adapted to receive the accounts payable batch data file to determine an aggregate amount of foreign currency desired by the customer to pay an aggregate of the plurality of individual accounts payables in the accounts payable batch data file and to request a foreign exchange quote on the aggregate amount. Advantageously, the foreign exchange transaction determiner totals the amount of funds required for each accounts payable listed in the accounts payable batch data. The software can also include a foreign exchange contract confirmer responsive to the foreign exchange quote on the aggregate amount and responsive to a confirmation that the customer desires to complete a foreign exchange based on the foreign exchange quote.

The software can further include a suspect record identifier adapted to compare the accounts payable batch data file prior to regulatory screening by the regulatory screener to a version of the accounts payable batch data file after regulatory screening by the regulatory screener. The comparison can be made to identify and tag any identified suspect record within the accounts payable batch data file with a suspicious record identifier to track suspect record activity by the suspicious record identifier.

The software additionally can include a foreign exchange transaction transferor responsive to at least one of the foreign exchange contract confirmer, the arrival of foreign exchange funds, or both. The foreign exchange transaction transferor can receive customer approval to prosecute the transaction from the foreign exchange contract confirmer and in an aspect of the present invention receive notification of the arrival of the foreign exchange funds. The foreign exchange transaction transferor is adapted to initiate transfer of the accounts payable batch data file to the foreign financial institution site for payment of the plurality of individual accounts payables with the aggregate amount of foreign currency and to transfer or make available foreign currency funds of a selected foreign currency into the nostro account of the foreign financial institution. The funds, for example, can be transferred by wire, and the accounts payable batch data file, for example, can be transferred over the area network. For example, the accounts payable batch data file will not be transferred until arrival of or the availability of the foreign exchange funds in a nostro account to avoid a potential payment risk to the domestic financial institution should customer funds for the foreign exchange not be available to conduct exchange. Also, a foreign financial institution may not act on instructions associated with the batch data file unless funds are already in or substantially simultaneously received in the nostro account. Alternatively, for example, the accounts payable batch data file can be expeditiously transferred on the anticipation of the arrival of or availability of such foreign exchange funds.

An embodiment of the present invention also advantageously provides a method for facilitating payments for a customer through a foreign financial institution using a batch payment process. The method includes the steps of tagging by a computer an accounts payable batch data file having a plurality of individual accounts payables received from a customer with an accounts payable batch data file identifier and screening the accounts payable batch data file for transactional data failing to meet preselected regulatory criteria associated with a foreign financial transaction to thereby define a post-screening accounts payable batch data file. The method also includes comparing an accounts payable batch data file prior to regulatory screening to a version of the accounts payable batch data file after regulatory screening to identify and to tag each individual accounts payable failing to meet the preselected regulatory criteria, defining a suspect record, with a suspicious record identifier to track suspect record activity by the suspicious record identifier.

In another embodiment of the present invention, the method includes comparing an accounts payable batch data file having a plurality of individual accounts payables prior to regulatory screening to a version of the accounts payable batch data file after regulatory screening to identify and to tag each individual accounts payable failing to meet the preselected regulatory criteria, defining a suspect record, with a suspicious record identifier to track suspect record activity by the suspicious record identifier. In this embodiment, the method can also include aggregating by a computer payment requirements of the individual accounts payables prior to regulatory screening to form an aggregate total of payment requirements for the pre-screening accounts payable batch data file, whereby the aggregate total indicates the foreign currency needed to fund the payment requirements of the customer. The method also includes obtaining a foreign exchange quote on the aggregate amount of foreign currency on behalf of the customer to determine an exchange rate for the aggregate total.

In another embodiment of the present invention, the method can include aggregating by a computer payment requirements of the individual accounts payables before regulatory screening to form an aggregate total of payment requirements for the pre-screening accounts payable batch data file, whereby the aggregate total indicates the foreign currency needed to fund the payment requirements of a customer. In this embodiment, the method also includes adding financial institution foreign exchange transaction fees and costs, defining a bank margin, to a first foreign exchange quote on the aggregate total to obtain a second foreign exchange quote to provide to the customer, and confirming the customer desires to complete a foreign exchange based on the second foreign exchange quote.

In another embodiment of the present invention, the method can include formatting a post-regulatory screening accounts payable batch data file to a predetermined format specification specified by a foreign financial institution and transmitting an encrypted and formatted post-screening accounts payable batch data file over an area network to a foreign financial institution computer associated with the foreign financial institution using a security protocol provided by the foreign financial institution. The method also includes auditing a reconciliation file received from the foreign financial institution over the area network for a possibility of an error in settling accounts of individual payees identified in the accounts payable batch data file.

The method also can include auditing a reconciliation file to confirm a post-regulatory screening accounts payable batch data file aggregate total of payment requirements match funding of a nostro account to verify proper prosecution of the payment requirements, to confirm the post-regulatory screening accounts payable batch data file payment requirements match respective nostro account payment activity by the foreign financial institution to reconcile an inflow of funds with the outflow of funds from the nostro account, and to compare the pre-regulatory screening accounts payable batch data file payment requirements with respective nostro account payment activity by the foreign financial institution to reconcile financial activity requested by a customer with batch activity conducted by a domestic financial institution. In this embodiment, the method can further include adding financial institution foreign exchange transaction fees and costs, defining a bank margin, to a first foreign exchange batch data file payments aggregate total to obtain a second foreign exchange batch data file payments aggregate total to provide to the customer, and transmitting a reconciliation file to the customer computer for review and reconciliation of dataflow activity identified in the reconciliation file by each of a respective plurality of amounts actually transferred to each of the plurality of specific payees of the plurality of individual accounts payables of the accounts payable batch data file.

Advantageously, embodiments of the present invention provide a domestic financial institution customer and domestic financial institution with an opportunity to facilitate payments through a foreign financial institution and yet make sure that such payments satisfy government or other regulatory criteria. Because the data file sent by the financial institution customer is executed as a batch, embodiments of the present invention advantageously can provide lower foreign exchange transaction fees as would be required if each accounts payable of the batch data file were individually serviced. Additionally, due to lump sum funding of the nostro account to cover the entire payment requirements of the batch, embodiments of the present invention also can reduce bank transaction fees, both foreign and domestic. Also, advantageously, embodiments of the present invention provide for facilitating implementation of regulatory requirements and provides for a robust audit trail.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 7 is a flow chart of a method to facilitate payment of accounts payables by a customer according to an embodiment of the present invention;

FIG. 8 is a schematic diagram of a graphical user interface ("GUI") depicting a customer login screen of a system to facilitate payment of accounts payables according to an embodiment of the present invention;

FIG. 9 is a schematic diagram of a GUI depicting a customer upload screen for a batch data file of a system to facilitate payment of accounts payables according to an embodiment of the present invention;

FIG. 10 is a schematic diagram of a GUI depicting a customer upload confirmation screen displaying the assigned batch file identifier of a batch data file of a system to facilitate payment of accounts payables according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Note, as stated previously, the term "batch" as used herein refers to an aggregate or group of a plurality of individual accounts payables, and more particularly, being handled collectively as a group for transferring and receiving files, data, and funds, and for obtaining goals and executing foreign exchange transactions therein. The term "batch" does not mean a linear sequence but instead refers to simultaneous processing such as, for example, cooking a batch of cookies. Also, embodiments of the present invention are described particularly in the context of a United States ("U.S.") bank as a domestic financial institution, U.S. government regulatory requirements and transferring funds and data to a foreign financial institution in another country such as, but not limited to, Mexico or England.

Figure 1:
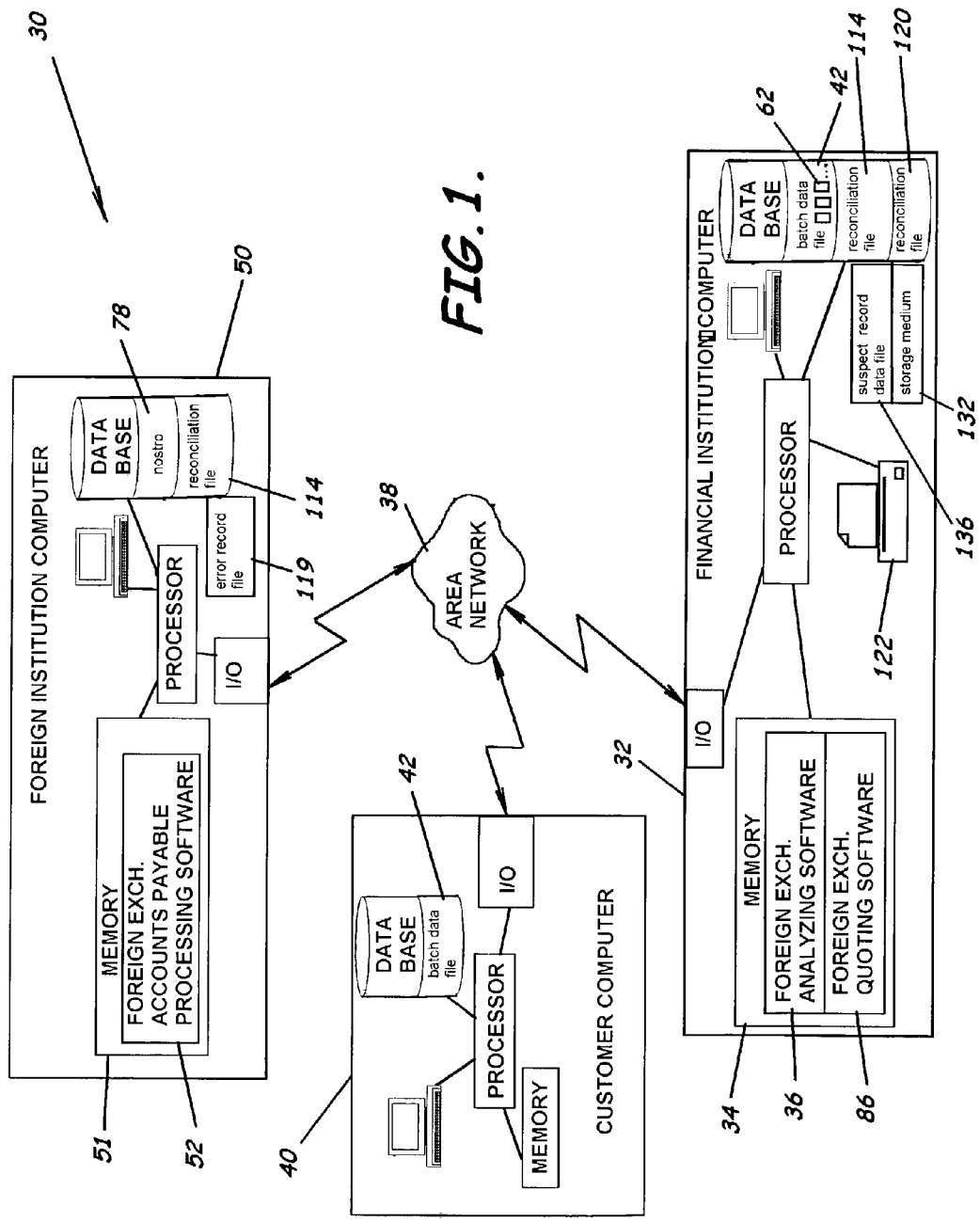
FIG. 1 is a schematic diagram of a system to facilitate payment of accounts payables from a foreign financial institution for a customer of a domestic financial institution according to an embodiment of the present invention.

As illustrated in FIGS. 1-14, embodiments of the present invention advantageously provide a system, software, and methods for facilitating payment of accounts payables from a foreign financial institution for a customer of a domestic financial institution. For example, the domestic financial institution is advantageously a bank, an entity operating like a bank, or other financial entities as understood by those skilled in the art. Perhaps as best shown in FIGS. 1 and 3, the system 30 includes a first financial institution computer positioned at a domestic financial institution site to define a domestic financial institution server 32. The computer can be, for example, a personal computer (PC) capable of functioning as a server or a plurality of computers on a local area network, or a "traditional" server computer or other medium as known by those skilled in the art. The domestic financial institution server 32 has a memory 34 associated therewith and foreign exchange analyzing software 36 stored in the memory 34 to analyze a foreign exchange transaction. The system 30 can also include an area network 38 in communication with the server 32. The area network 38 can be, for example, a wide area network, the Internet, a global communication network, a dedicated communication network link, or a portion of the infrastructure of a public switched telephone network. The system 30 can also include a second customer computer 40 in communication with the area network 38, positioned remote from the server 32 at a customer site, and positioned to transmit an accounts payable batch data file 42 to the foreign exchange analyzing software 36 stored on the server 32. The customer computer 40 is typically a PC but may be various other computers or communication line access known by those skilled in the art. The system 30 can further also include a foreign financial institution computer 50 having memory 51 and having foreign exchange accounts payable processing software 52 in communication with the area network 38. The foreign financial institution computer 50 is typically a server but advantageously can take other forms such as, for example, a PC or desktop type workstation. The foreign financial institution computer 50 can be positioned to process payments according to data or instructions contained in or associated with the accounts payable batch data file 42.

The foreign exchange analyzing software 36 is adapted to communicate through an area network 38 with a customer of the domestic financial institution to analyze an actual or potential foreign exchange transaction. The software as understood by those skilled in the art, includes both program instructions and code such as storable on various memory or storage medium, including, but not limited to, hard drive memory, compact disc, magnetic disks, and various other software storage that operates in conjunction with being read from memory, such as by various hardware/software devices. The portions or elements of the software, as described herein, can be portions of program instructions or code as understood by those skilled in the art. As perhaps best shown in FIGS.

1-3, the foreign exchange analyzing software 36 can include an accounts payable batch identifier 60 positioned to tag an accounts payable batch data file 42 having a plurality of individual accounts payables 62 received from a customer with a batch data file identifier 64, e.g., a numeric, alphanumeric, or other code as understood by those skilled in the art. The foreign exchange analyzing software 36 also can include a regulatory screener 66 having a preselected regulatory criteria associated with a foreign financial transaction. The regulatory criteria can originate from one or more regulatory or government agencies such as the Office of Foreign Assets Control (OFAC) in the United States. The software 36 is preferably positioned to receive the tagged accounts payable batch data file 42 and positioned to screen the accounts payable batch data file 42 for any transactional data failing to meet the preselected regulatory criteria. The foreign exchange analyzing software 36 can identify each payee (beneficiary) and related information in order to expedite the movement of funds via wire transfer. Although as set forth herein, embodiments of a system, software, and methods are particularly advantageous as set forth herein, other accounts processing can also be used according to the present invention. For example, the preferred embodiment describes a customer batch data file in the form of accounts payables. Accounts payables are at present the best example due to the immediate commercial need of this form of batch service. However, the described system, software, and methods can be easily modified to accept a batch file in such alternative forms as accounts receivables or monetary type requirements as known by those skilled in art that are conducive to being submitted in the form of a batch. Additionally, the system, software, and methods can be implemented by a financial institution in a foreign country conducting the role of "domestic financial institution" and having a nostro account established in the United States or other country. Additionally, the foreign financial institution can have similar type of account in another foreign country having foreign financial institutions associated with that country.

In an embodiment of the present invention, the foreign exchange analyzing software 36 also includes a foreign exchange transaction determiner 68 positioned to receive the tagged accounts payable batch data file 42 to determine an aggregate amount of foreign currency desired by the customer to pay an aggregate 70 of the plurality of individual accounts payables 62 in the accounts payable batch data file 42. The aggregate 70 is formed by calculating the sum total of each of the individual payment requirements of the plurality of accounts payables 62. The foreign exchange transaction determined 68 is also positioned to request a foreign exchange quote 48 on the aggregate amount 70.

The foreign exchange analyzing software 36 can further include a foreign exchange contract confirmer 72 positioned to receive the foreign exchange quote 48 on the aggregate amount 70. The foreign exchange contract confirmer 72, responsive to a foreign exchange quote 48, confirms that the customer desires to complete a foreign exchange based on the foreign exchange quote 48. After receiving the quote, the foreign exchange contract confirmer 72 typically provides the quote and the aggregate total to the customer, allowing the customer to approve the quote, and thus confirm the desire to complete the foreign exchange.

In an alternative embodiment of the present invention, the foreign exchange analyzing software 36 includes a nostro account verifier (not shown), such as a portion of the software in programmed code or instructions or electronic implementation as understood by those skilled in the art, responsive to the foreign exchange contract confirmer 72 to determine whether the nostro account 78 contains funds sufficient to fund or cover the transaction related to the accounts payable batch data file 42. If the nostro account 78 has insufficient funds to cover the requested transaction or if no nostro account 78 exists, at least one of the foreign exchange contract confirmer 72 or nostro account verifier can request or authorize a foreign exchange to fund or create the nostro account 78, typically through a foreign exchange computer associated with the domestic financial institution or an external foreign exchange transaction provider. Although in an embodiment of the present invention shown in FIGS. 5 and 6, the nostro account funding is temporally tied to the transmission of the accounts payable batch data file 42 of each individual customer, other timing methodologies as understood by those skilled in the art, generally related to improving foreign exchange rate spread are within the scope of the present invention as well. In other words, the domestic financial institution can elect to purchase an additional position in the nostro account 78, can wait until the financial institution customer properly funds the transaction to perform the purchase, or if sufficient funds are in the nostro account 78 to cover the payment requirements of the batch data file 42, the domestic financial institution can delay in providing additional funding to the nostro account 78 in order to await an anticipated improved foreign exchange rate.

In an embodiment of the present invention, the foreign exchange analyzing software 36 can also include a foreign exchange transaction transferor 74 responsive to the foreign exchange contract confirmer 72 to initiate transfer of the accounts payable batch data file 42 to the foreign financial institution site for payment of the plurality of individual accounts payables 62 with the aggregate amount of foreign currency 70 and to initiate transfer of foreign currency funds 76 of a selected foreign currency into a nostro account 78 (see FIG. 1) associated with the foreign financial institution. In an aspect of the present invention, the foreign exchange transaction transferor 74 is responsive to at least one of the contract confirmer 72 or nostro account verifier to delay initiation of transfer of the accounts payable batch data file 42 until arrival of foreign currency funds 76. That is, preferably the foreign exchange transaction transferor 74 can receive customer approval to prosecute the transaction from the foreign exchange contract confirmer 72 and can receive notification of the arrival of the foreign exchange funds 76. The funds are can be transferred by wire and the accounts payable batch data file 42 is transferred over the area network 38. In an embodiment of the present invention, the accounts payable batch data file 42 will not be transferred until arrival of the foreign exchange funds 76 to avoid a potential payment risk to the domestic financial institution. In an alternative embodiment, the accounts payable batch data file 42 may be expeditiously transferred on the anticipation of the arrival of such foreign exchange funds 76.

The foreign exchange transaction transferor 74 is adapted to initiate transfer of the accounts payable batch data file to the foreign financial institution site for payment of the plurality of individual accounts payables with the aggregate amount of foreign currency and to transfer or make available foreign currency funds of a selected foreign currency into the nostro account of the foreign financial institution. The funds, for example, can be transferred by wire, and the accounts payable batch data file, for example, can be transferred over the area network. For example, the accounts payable batch data file 42 will not be transferred until arrival of or the availability of the foreign exchange funds in a nostro account to avoid a potential payment risk to the domestic financial institution should customer funds for the foreign exchange not be available to conduct exchange. Also, a foreign financial institution may not act on instructions associated with the batch data file unless funds are already in or substantially simultaneously received in the nostro account. Alternatively, for example, the accounts payable batch data file 42 can be expeditiously transferred on the anticipation of the arrival of or availability of such foreign exchange funds.

The foreign exchange analyzing software 36 can further include a suspect record identifier 80 positioned to compare the accounts payable batch data file 42 prior to regulatory screening by the regulatory screener 66 to a version of the accounts payable batch data file 42 after regulatory screening by the regulatory screener 66. The comparison can be accomplished to identify and tag each, if any, suspect record 82 found within the accounts payable batch data file 42 with a suspicious record identifier 84. Similar to the accounts payable batch identifier 64, the suspicious record identifier 84 can take the form of a numeric, alphanumeric, or other code as understood by those skilled in the art. Additionally, in one aspect of the invention, where a suspect record 82 has been identified, the suspicious record identifier 84 can be used to track suspect record activity by using the identifier, e.g., code embedded signal or character, to follow the activity.

In an embodiment of the present invention, the system 30 further includes foreign exchange quoting software 86 (see also FIG. 1) stored in the memory of the domestic financial institution server 32, or stored in memory of one or more other computers associated with the domestic financial institution, and responsive to the foreign exchange transaction determiner 68 to provide a foreign exchange quote 48 to the foreign exchange transaction confirmer 72. The quoting software 86 advantageously can be controlled and operated by the domestic financial institution to enhance speed of response, quality, and other control issues as understood by those skilled in the art. Alternatively, the foreign exchange quoting software can also reside on a computer of another entity outside of the domestic financial institution. The foreign exchange transaction determiner 68 requests a foreign exchange quote 48 on the aggregate amount of foreign currency 70 by conveying foreign currency needs to the foreign exchange quoting software 86. The foreign exchange contract confirmer 72 is positioned to receive the foreign exchange quote 48. After receiving the foreign exchange quote 48, the foreign exchange contract confirmer 72, positioned to notify the second customer computer 40 of a pending contractual transaction, can, typically through the area network 38, notify or provide the customer with a quote. Approval of the quote by the customer is an approval by the customer of the foreign exchange contract.

The foreign exchange contract confirmer 72 can request a foreign exchange trade on the aggregate amount of foreign currency 70 by conveying foreign currency needs to the foreign exchange trading software 46 on a foreign exchange computer. The foreign exchange computer can be internal to the domestic financial institution or can be external. Foreign exchange trading software stored on the foreign exchange computer can notify the foreign exchange contract confirmer 72 of a completed transaction. In an aspect of the present invention, the foreign exchange contract confirmer 72 is adapted to receive the notification by the foreign exchange trading software.

In an embodiment of the present invention, the system 30 further includes a foreign financial institution computer 50 having memory 51 associated therewith. The foreign financial institution computer 50 correspondingly has foreign exchange accounts payable processing software 52 stored in the memory 51. The computer 50 is preferably positioned at a foreign financial institution site remote from the domestic financial institution server 32, and in communication with the area network 38. In this embodiment, as best shown in FIGS. 2-3, the foreign exchange analyzing software 36 further includes a formatter 88 positioned to convert the accounts payable batch data file 42 to a predetermined format specified by the foreign financial institution, an encryptor 90 positioned to encrypt the accounts payable batch data file for transmission to the foreign financial institution computer 50, and a security protocol generator 92 positioned to generate a security protocol 94 and to transmit the accounts payable batch data file 42 from the domestic financial institution server 32 using the security protocol 94 specified by the foreign financial institution.

In another embodiment of the present invention, each of the plurality of individual accounts payables 62 of the accounts payable batch data file 42 includes one or more accounts payable records 96, e.g., invoice number, amount to be paid, entity to be paid, location of entity, customer reference number, or other types of data as understood by those skilled in the art. The accounts payable batch data file 42 preferably has a plurality of accounts payable records 96. One or more of the plurality of accounts payable records 96 is screened from the accounts payable batch data file 42 by the regulatory screener 66 and identified as having transactional data failing to meet the preselected regulatory criteria of the regulatory screener 66 to define a suspect transaction 98. The suspect transaction 98 can be separated and withheld from the accounts payable batch data file 42 to be transferred to the foreign financial institution computer 50. Correspondingly, funds associated with the separated and withheld suspect transaction can also be withheld or frozen.

Figure 2:
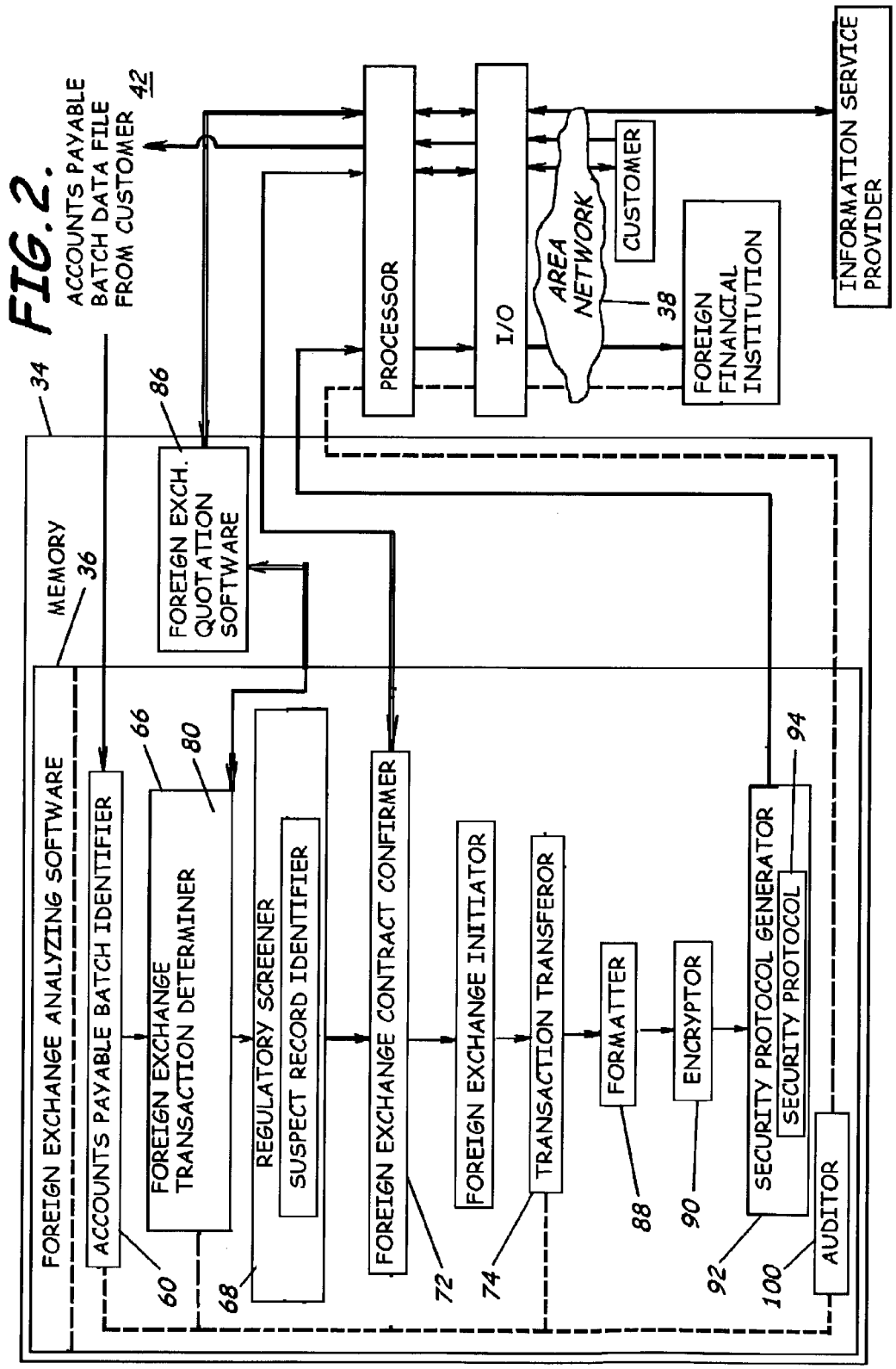
FIG. 2 is a schematic diagram of software to facilitate payment of accounts payables stored in the memory of a domestic financial institution computer according to an embodiment of the present invention.
Figure 3:
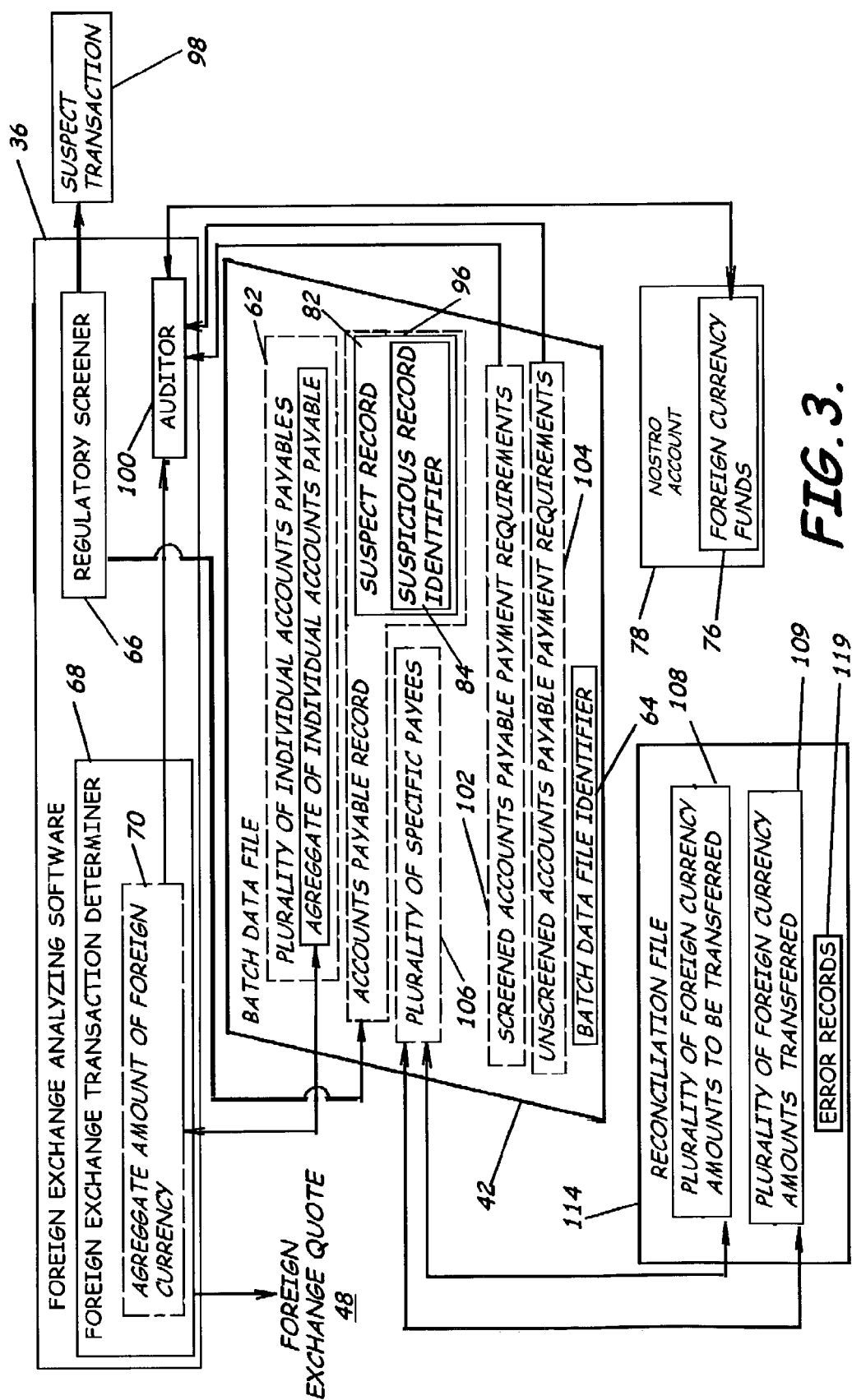
FIG. 3 is a schematic diagram of a system to facilitate payment of accounts payables from a foreign financial institution for a customer of a domestic financial institution according to an embodiment of the present invention.
Figure 4:
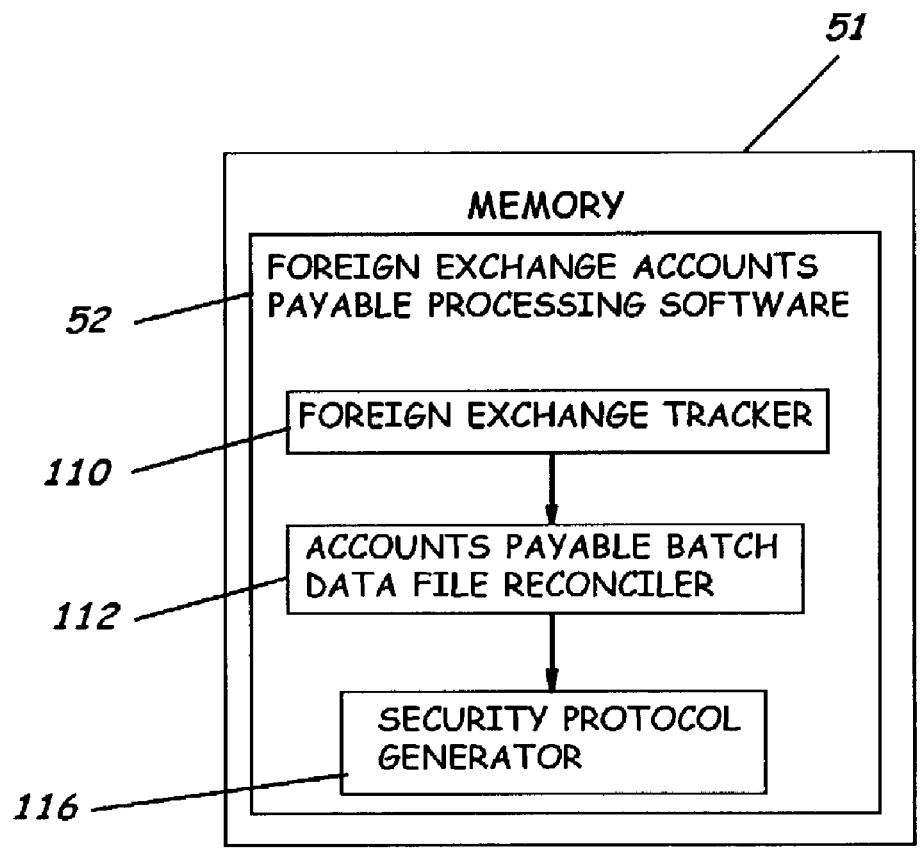
FIG. 4 is a schematic diagram of software to facilitate payment of accounts payables stored in the memory of a foreign financial institution computer according to an embodiment of the present invention.

The system 30, as perhaps best shown in FIGS. 2-4, also includes a foreign financial institution computer 50 positioned at the foreign financial institution site. The foreign financial institution computer 50, for example, preferably is in communication with the domestic financial institution server 32 through the area network 38. The foreign financial institution computer 50 has memory 51 associated therewith and has foreign exchange accounts payable processing software 52, as understood by those skilled in the art, stored in the memory 51 and is positioned to audit and store monetary transactions of the nostro account 78. This auditing and tracking function capability can be utilized to generate a reconciliation or similar detailed report of the prosecution of each payment requirement associated with each individual accounts payable 62 of a claim accounts payable batch data file 42 (described below). In this embodiment, the foreign exchange analyzing software 36, in communication with the foreign exchange accounts payable processing software 52 of the foreign financial institution computer 50 through the area network 38, further includes a foreign exchange transaction auditor 100. The foreign exchange transaction auditor 100 is positioned to match the screened accounts payable batch data file aggregate amount 70 with nostro account activity which can include an amount of foreign currency funds 76 transferred to or an amount from the nostro account 78. This provides the domestic financial institution the ability to reconcile the inflow of money into the nostro 78 with the outflow. The auditor 100 is also positioned to match the screened accounts payable batch data file payment requirements 102 with nostro account payment activity by the foreign financial institution. This can provide the domestic financial institution the ability to verify that what was required to be paid was actually paid. The auditor 100 is also positioned to compare the unscreened accounts payable batch data file payment requirements 104 with nostro account payment activity by the foreign financial institution. This can provide the domestic financial institution the ability to reconcile batch activity to financial activity.

The system 30 also can include a foreign financial institution computer 50 having memory 51 associated therewith and having foreign exchange accounts payable processing software 52 stored therein. In this embodiment, the foreign financial institution computer 50 is positioned at a foreign financial institution site remote from the domestic financial institution server 32 and is in communication with the domestic financial institution through the area network 38. The computer 50 is positioned to receive the accounts payable batch data file 42 from the domestic financial institution server 32, through the area network 38, to process an accounts payable batch data file 42.

In a variation of this embodiment, the accounts payable batch data file 42 can further include a plurality of specific payees 106 and a respective plurality of amounts 108 to be distributed by the foreign financial institution from the nostro account 78 to each of the plurality of specific payees 106. In this embodiment, the foreign exchange accounts payable processing software 52 on the foreign financial institution computer 50 includes a foreign exchange tracker 110 positioned to track a foreign exchange transaction and an accounts payable batch data file reconciler 112 positioned to compile a reconciliation file 114. The reconciliation file 114, for example, preferably includes relational data to display a relation between the plurality of specific payees 106 of the accounts payable batch data file 42, a respective plurality of foreign currency amounts 108 to be transferred to each of the plurality of specific payees 106 of the accounts payable batch data file 42, and a respective plurality of foreign currency amounts 109 actually transferred to each of the plurality of specific payees 106.

In another variation of this embodiment, the foreign exchange accounts payable processing software 52 on the foreign financial institution computer 50 can further include an accounts payable batch data file reconciler 112 positioned to compile a reconciliation file 114. The reconciliation file 114 includes a plurality of individual accounts payables 62 extracted from within the accounts payable batch data file 42 transferred by the domestic financial institution server 32 to the foreign financial institution computer 50. The reconciliation file 114 can provide detailed accounting of the actions taken by the foreign financial institution in prosecuting the payment requirements on each of the plurality of individual accounts payables 62. The foreign financial institution computer 50 also includes a security protocol generator 116 to transmit the reconciliation file 114 through the area network 38 to the domestic financial institution server 32. In this embodiment, the foreign exchange analyzing software 34 on the domestic financial institution server 32 also further includes a foreign exchange transaction auditor 100 positioned to receive the reconciliation file 114 from the accounts payable batch data file reconciler 112 of the foreign exchange accounts payable processing software 52 through the area network 38. The foreign exchange transaction auditor 100 functions to audit the reconciliation file 114 for a possibility of an error, to modify the reconciliation file 114, to add a bank margin/spread to the individual accounts payables 62, and to transmit the modified reconciliation file 120 to the second customer computer 40.

Figure 5:
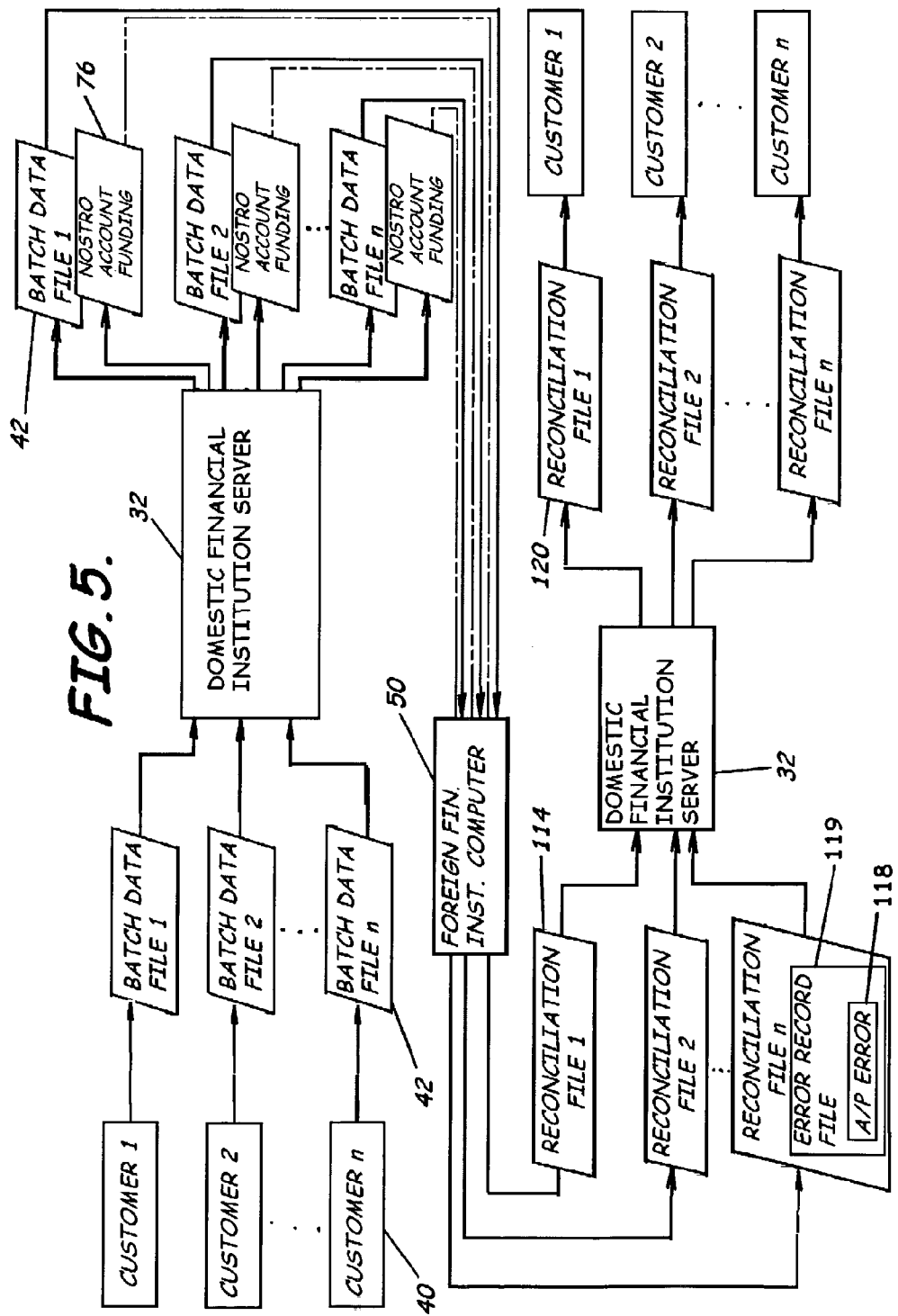
FIG. 5 is a schematic diagram of a system to facilitate payment of accounts payables according to an embodiment of the present invention.

In another embodiment of the present invention, at least one of the plurality of individual accounts payables of the reconciliation file 114 does not contain required information or contains incorrect information, defining individual accounts payable error 118 (see FIG. 5). In this embodiment, the at least one of the plurality of individual accounts payables 62 containing the individual accounts payable error 118 is returned for correction and re-submission by the second customer computer 40 to the foreign exchange analyzing software 36 stored on the domestic financial institution server 32. The individual accounts payable error 118 is typically returned as part of the reconciliation file 114 (FIG. 5) but can be alternatively returned in a separate error record file 119. The at least one of the plurality of individual accounts payables 62 containing the individual accounts payable error 118 can be returned with the modified reconciliation file 120 to the customer computer 40. This feature advantageously provides the customer the ability to make corrections to the at least one of the plurality of individual accounts payables 62 containing the individual accounts payable error 118. The at least one of the plurality of individual accounts payables 62 containing the individual accounts payable error 118 can be stored on the customer computer 40 in a new accounts payable batch data file 42 prior to or until resubmission by the customer computer 40 to the foreign exchange analyzing software 36 stored on the domestic financial institution server 32.

The foreign exchange transaction auditor 100 on the domestic financial institution server 32 can reconcile dataflow activity of the reconciliation file 114 as a combination of the plurality of individual accounts payables 62 to thereby define a batch basis reconciliation file 120. In this embodiment, the second customer computer 40 receives the batch basis reconciliation file 120 transferred from the foreign exchange transaction auditor 100 on the domestic financial institution server 32 after the batch basis reconciliation occurs at the domestic financial institution. As understood by those skilled in the art, the batch basis reconciliation file 120 preferably is in a format whereby the customer can reconcile dataflow activity of the batch basis reconciliation file 120 by each of a respective plurality of amounts actually transferred 109 to each of the plurality of specific payees 106 of the plurality of individual accounts payable 62.

Advantageously, the system for facilitating payment of accounts payable from a foreign financial institution for a customer of a domestic financial institution 30 provides a simple and efficient data and file flow. For illustrative purposes only, FIG. 5 shows a schematic of a simplified data flow. Customers$_{1-n}$ with access to a file transfer media such as customer computer 40 and each having a batch data file 42 access a domestic financial institution server 32, preferably through use of a domestic financial institution web page 134 (see FIGS. 8-13), and transfers the accounts payable batch data files to the domestic financial institution server 32. After providing a foreign exchange quote 48 and obtaining authorization from the customer$_{1-n}$, the batch data file 42 with corresponding individual nostro account funding 76, if required, is transferred to a foreign financial institution, e.g., a bank, via a foreign financial institution or bank computer 50 or other file transfer media. The accounts payable batch data file 42 is normally transmitted through the area network 38 and the funds are normally separately sent via wire transfer or other methodology known by those skilled in the art. After satisfying the payment of the individual payees 106 within the accounts payable batch data file 42 according to the instructions of the individual customer$_{1-n}$, the foreign financial institution generates and transfers to the domestic financial institution server 32 a reconciliation file 114 corresponding to each of the batch data files 42. After auditing the reconciliation files 114 and adding a bank margin/spread to the file corresponding to the bank fees and costs included in the original foreign exchange quote 48, a modified reconciliation file 120 corresponding to each of the individual batch data files 42 are transferred to the corresponding customers$_{1-n}$.

In an alternative embodiment of the present invention, a customer can, for reasons such as for accounting purposes, alternatively wish to separate a plurality of individual payees 106 into a plurality of separate batch data files 42. The data and money flow in this alternative is similar to that described with reference to FIG. 5, except that the plurality of batch data files 42 of the single customer can also be aggregated to provide a single quote and single nostro account funding 76, if required, for the plurality of batch data files 42.

An embodiment of the present invention also advantageously provides foreign exchange analyzing software 36 stored on a storage media 132 (e.g., FIGS. 1-2) for facilitating payments for a customer through a foreign financial institution using a batch payment process to analyze a foreign exchange transaction. In an embodiment of the present invention, the software 36 includes a regulatory screener 66 adapted to receive an accounts payable batch data file 42 having a plurality of individual accounts payables 62 received from a customer. The regulatory screener 66 screens the accounts payable batch data file 42 for any transactional data failing to meet a preselected regulatory criteria associated with a foreign financial transaction.

As perhaps best shown in FIG. 2, the software 36 also includes a foreign exchange transaction determiner 68 responsive to the screened accounts payable batch data file 42 to determine an aggregate amount of foreign currency 70 desired by the customer to pay an aggregate of the plurality of individual accounts payables 62 in the accounts payable batch data file 42 and to request a foreign exchange quote 48 on the aggregate amount 70. Advantageously, the foreign exchange transaction determiner 68 can total the amount of funds required for each accounts payable listed in the accounts payable batch data file 42, less the amount of any individual accounts payable(s) 62 found to be suspect by the regulatory screener 66 and not immediately resolved.

The foreign exchange analyzing software 36 can also include a foreign exchange contract confirmer 72 responsive to a foreign exchange quote 48 on the aggregate amount 70 and responsive to a confirmation that the customer desires to complete a foreign exchange based on the foreign exchange quote 70. The software 36 can further include a suspect record identifier 80 adapted to compare the accounts payable batch data file 42 prior to regulatory screening by the regulatory screener 66 to a version of the accounts payable batch data file 42 after regulatory screening by the regulatory screener 66. The comparison can be made to identify and tag any identified suspect record 82 within the accounts payable batch data file 42 with a suspicious record identifier 84 to track suspect record activity by the suspicious record identifier 84.

Each of the plurality of individual accounts payables 62 of the accounts payable batch data file 42 can include an accounts payable record 96. The accounts payable record 96 is defined as individual data fields of an individual accounts payable 62 but can also refer to the entire payable 62. Thus, the accounts payable batch data file 42 can have a plurality of accounts payable records 96. The regulatory screener 66 is adapted to screen one of the plurality of accounts payable records 96 from the accounts payable batch data file 42 and identify one of the plurality of accounts payable records 96 as having transactional data failing to meet the preselected regulatory criteria of the regulatory screener 66 to define a suspect transaction 98. The suspect transaction 98 identified by the regulatory screener 66 is separated and withheld from the accounts payable batch data file 42 to be transferred to the foreign financial institution computer 50. The software 36 can further include an accounts payable batch identifier 60 adapted to tag an accounts payable batch data file 42 having a plurality of individual accounts payables 62 received from a customer with a batch data file identifier 64, to also aid in tracking and identification purposes.

Advantageously, the foreign exchange transaction determiner 68 is adapted to request the foreign exchange quote 48 on the aggregate amount from a foreign exchange quoting software 86. The foreign exchange quoting software 86 is responsive to the foreign exchange transaction determiner 68 and adapted to provide a foreign exchange quote 48 to the foreign exchange transaction determiner 68. The foreign exchange quoting software 86 conveys or publishes the foreign currency needs to, for example, an information service provider, which in turn provides exchange rate information to the foreign exchange quoting software 86. The foreign exchange quoting software 86 further is adapted to generate a foreign exchange quote 48 on the aggregate amount of foreign currency 70 responsive to an information service provider. The information service provider can be internal to the domestic financial institution or can be from an external information service provider preferably accessed through the area network 38.

The foreign exchange contract confirmer 72 correspondingly is responsive to the foreign exchange quoting software 86 and is adapted to receive the foreign exchange quote 48 on the aggregate amount of foreign currency from the foreign exchange quoting software 86. After receiving the quote, 48 the foreign exchange contract confirmer 72 can notify, through the area network 38, the second customer computer 40 of a pending contractual transaction for approval by the customer (FIG. 13) based on the quote 48. The foreign exchange contract confirmer 72 is further adapted to receive authorization from the second customer computer 40 to execute the foreign exchange transaction and, correspondingly, is adapted to request the foreign exchange trade on the aggregate amount of foreign currency 70 by conveying foreign currency needs to foreign exchange trading software on a foreign exchange computer. The foreign exchange trading software stored on the foreign exchange computer correspondingly is adapted to notify the domestic financial institution server 32 of a completed transaction. The foreign exchange analyzing software 36 can further include a nostro account verifier (not shown) responsive to the foreign exchange contract confirmer 72 and adapted to ascertain and help manage the foreign currency "position" of a nostro account 78 with a foreign financial institution, which, in an alternative embodiment of the present invention can form a prerequisite determination as to whether or not the foreign exchange transaction requires an immediate foreign exchange trade.

The foreign exchange analyzing software 36 can include a foreign exchange transaction transferor 74 responsive to the foreign exchange contract confirmer 72 and/or alternatively the nostro account verifier and/or responsive to arrival of foreign exchange funds. The foreign exchange transaction transferor 74 is adapted to initiate transfer of foreign currency funds of a selected foreign currency, typically by wire, into the created nostro account 78 with the foreign financial institution and to transfer the accounts payable batch data file 42, i.e., through the area network, to the foreign financial institution site for payment of the plurality of individual accounts payables 62 with the aggregate amount of foreign currency 70. The software 36 can include a formatter 88 adapted to convert the accounts payable batch data file 42 to a predetermined format specified by the foreign financial institution. In this embodiment, the software 36 can also include an encryptor 90 adapted to encrypt the accounts payable batch data file 42 for transmission to a foreign financial institution computer 50 and a security protocol generator 92 adapted to generate a security protocol 94 specified by the foreign financial institution to transmit the accounts payable batch data file 42 from the storage media 132 using the security protocol 94 specified by the foreign financial institution.

The foreign exchange analyzing software 36 can further include a foreign exchange transaction auditor 100 responsive to the accounts payable batch data identifier 66, the foreign exchange transaction determiner 68, and the foreign exchange transaction transferor 74, and adapted to communicate with the foreign financial institution computer 50 through the area network 38. The auditor 100 is adapted to match the screened accounts payable batch data file aggregate amount 70 with an amount of foreign currency funds transferred to the nostro account 78 to verify that inter-bank funding was conducted according to domestic financial institution standards. The auditor 100 is also adapted to match the screened accounts payable batch data file payment requirements with nostro account payment activity by the foreign financial institution to verify the funds dispersed equal the amount required to verify what was required to be paid to the plurality of specific payees 106 was properly paid. The auditor 100 is further adapted to compare the unscreened accounts payable batch data file payment requirements with nostro account payment activity by the foreign financial institution in order to reconcile batch activity to financial activity.

In another embodiment of the present invention, the foreign exchange analyzing software 36 includes a foreign exchange transaction auditor 100 adapted to receive a reconciliation file 114. The reconciliation file 114 has a plurality of individual accounts payables 62 which are extracted from within the accounts payable batch data file 42 transferred by the foreign exchange transaction transferor 74 on the storage media through the area network 38 to the foreign financial institution computer 50. The auditor 100 functions to audit the reconciliation file 114 for a possibility of an error. Additionally, the auditor 100 can modify the reconciliation file 114 to add a bank fees and costs to the individual accounts payables 62 and to transmit the modified reconciliation file to the second customer computer 40. In an extension of this embodiment, the auditor 100 is also adapted to reconcile dataflow activity of the reconciliation file 114 as a combination of the plurality of individual accounts payables 62 to thereby define a batch basis reconciliation file 120. The auditor 100 is further adapted to transmit the batch basis reconciliation file 120 to the second customer computer 40 after batch basis reconciliation. The batch basis reconciliation file 120 is preferably in a format whereby the customer may reconcile dataflow activity of the batch basis reconciliation file 120 by each of a respective plurality of amounts actually transferred 109 to each of the plurality of specific payees 108 of the plurality of individual accounts payable 62, and verify proper payment.

An embodiment of the present invention also advantageously provides a method for facilitating payments for a customer through a foreign financial institution using a batch payment process. Generally, the method includes capturing accounts payable batch data file uploaded from a customer, obtaining for a foreign exchange quote based on the aggregate amount of funding required within the accounts payable batch data file, performing regulatory screening, obtaining customer approval to execute the foreign exchange transaction, funding a nostro account in a foreign financial institution in order for the foreign financial institution to disperse funds according to the accounts payable batch data file, transmitting the batch data file and funds to the foreign financial institution, processing a reconciliation file developed by the foreign financial institution, providing a reconciliation file to the customer, and auditing the process.

More specifically, as perhaps best shown in FIGS. 6A-14, a financial institution customer normally with a previously established account (block 140) first performs a step of login (see FIG. 7) to a domestic financial institution a server 32 having foreign exchange analyzing software 36 stored therein through a web page 132 (see FIG. 8). The financial institution customer next selects and uploads or transmits (block 142) a previously created batch data file 42, preferably through another web page 134 (see FIG. 9) using a secure data link and file encryption to be processed by the domestic financial institution server 32. The financial institution customer is generally provided between three to five file formats to select in developing or formatting the accounts payable batch data file 42.

Figure 6A:
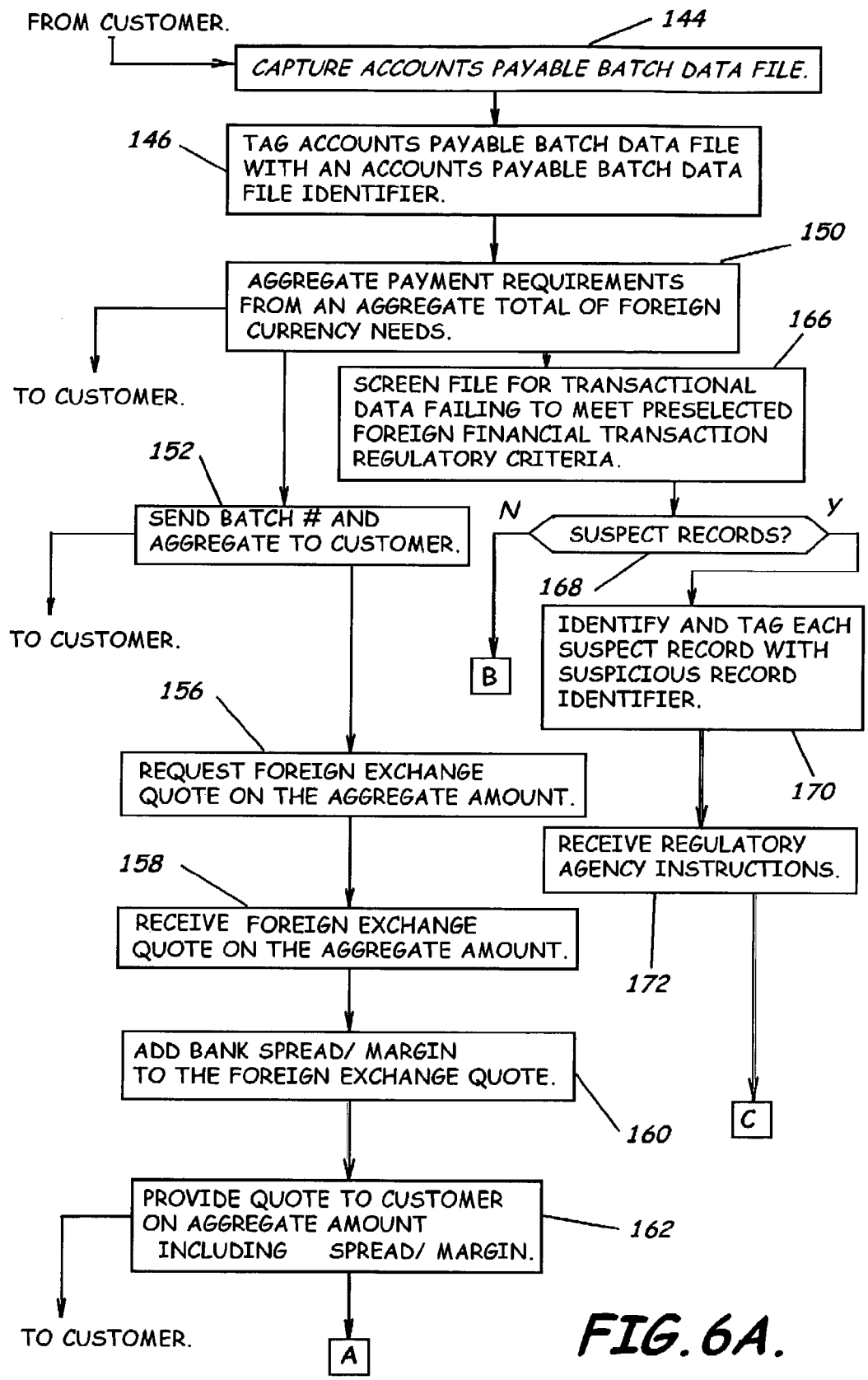
FIGS. 6A-6B are flow charts of a method to facilitate payment of accounts payables by a customer according to an embodiment of the present invention.
Figure 6B:
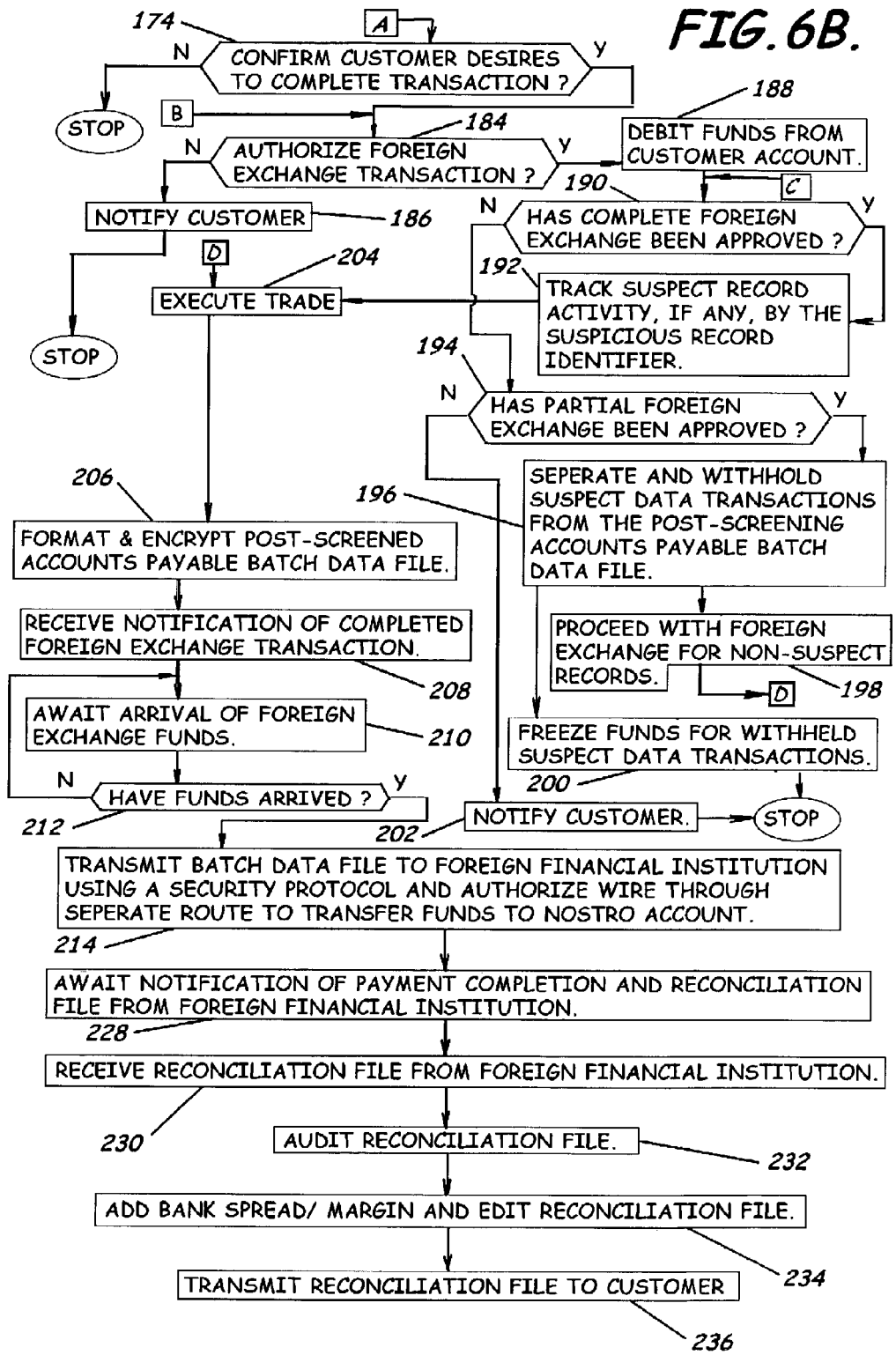
Figure 11:
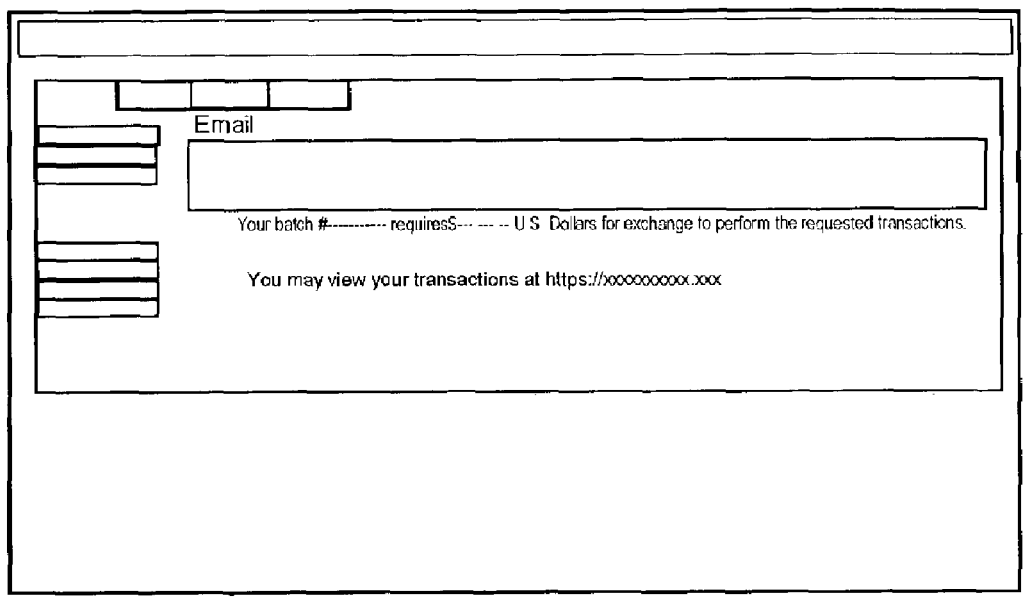
FIG. 11 is a schematic diagram of a GUI depicting a customer batch number associated with an aggregate amount for a batch data file of a system to facilitate payment of accounts payables according to an embodiment of the present invention.
Figure 12:
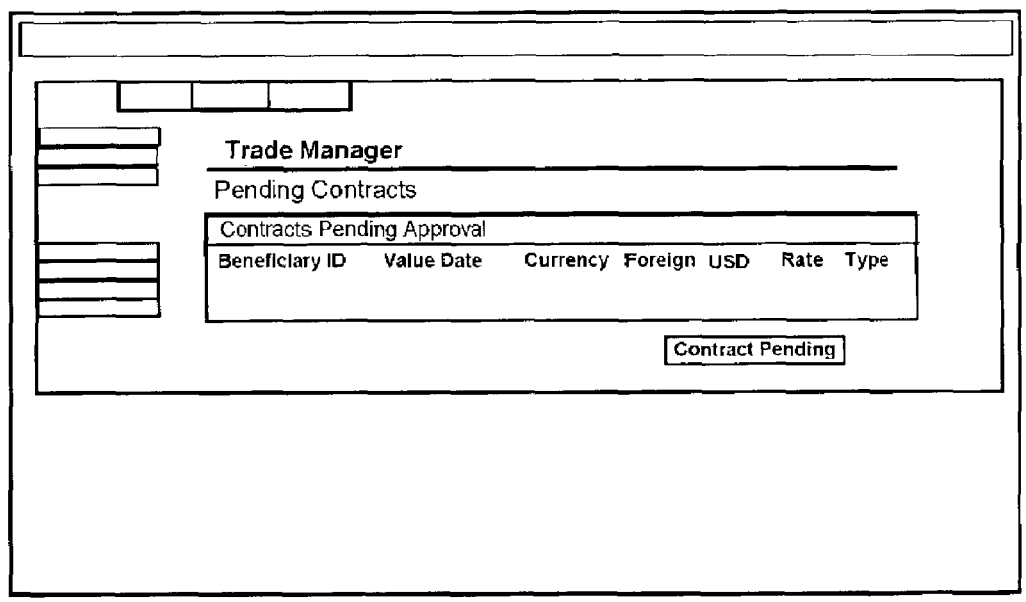
FIG. 12 is a schematic diagram of a GUI depicting an aggregate amount for a batch data file of a system to facilitate payment of accounts payables according to an embodiment of the present invention.
Figure 13:
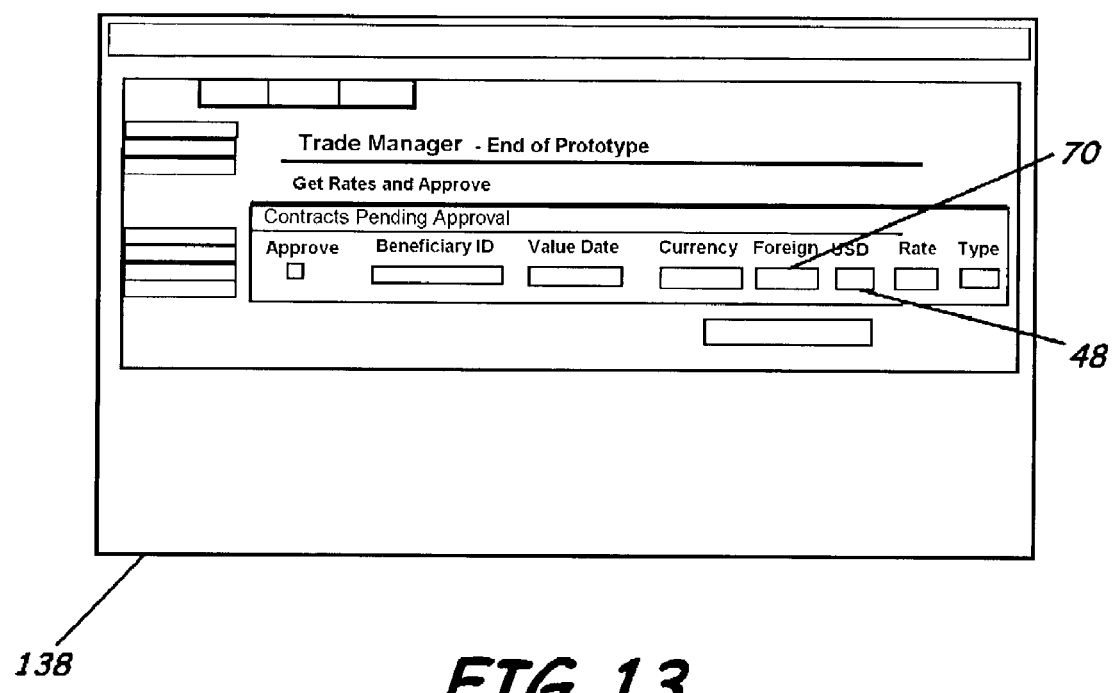
FIG. 13 is a schematic diagram of a GUI depicting a customer exchange transaction confirmation and approval screen of a system to facilitate payment of accounts payables according to an embodiment of the present invention.
Figure 14:
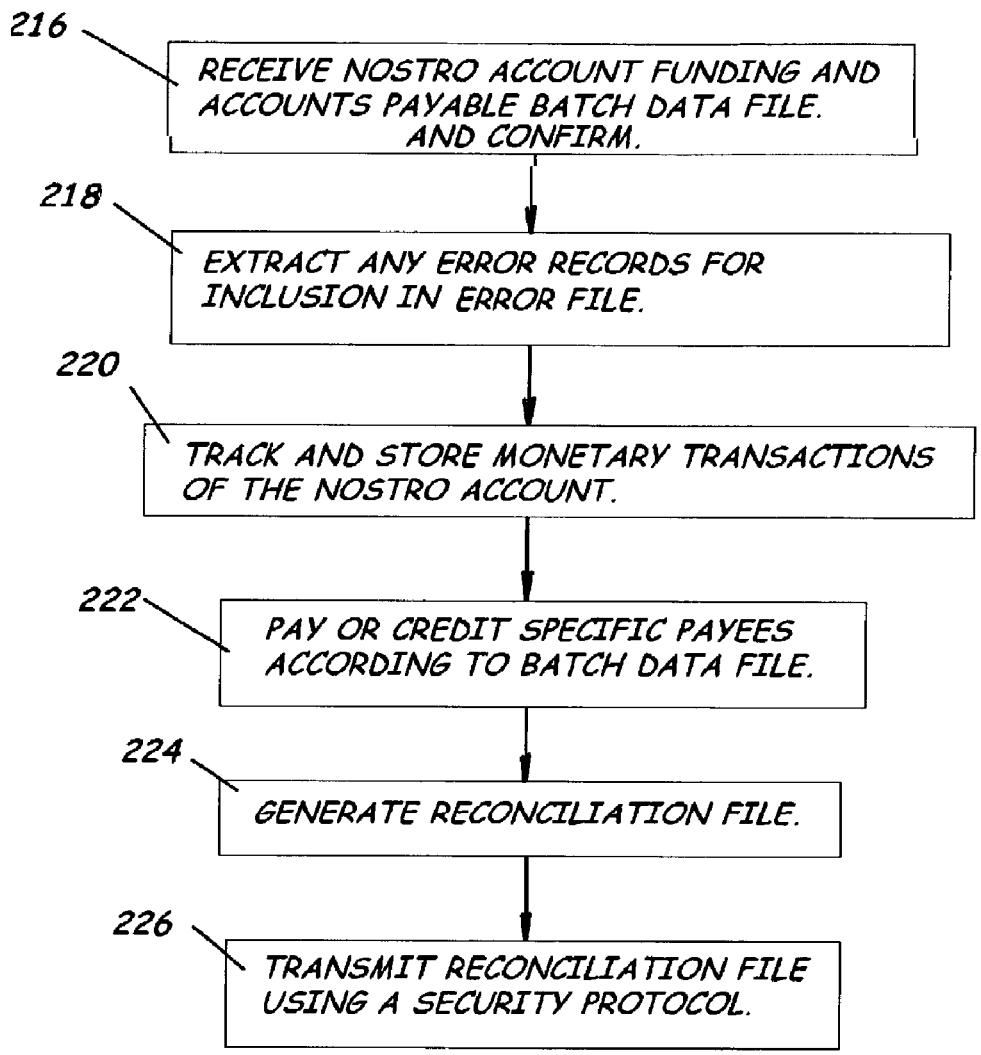
FIG. 14 is a flow chart of a method to facilitate payment of accounts payables illustrating steps occurring at a foreign financial institution according to an embodiment of the present invention.

As shown in FIGS. 6A-6B, in an embodiment of the present invention, the method can further include the step of capturing (block 144) the electronically encrypted customer accounts payable batch data file 42, in the form of an aggregate of individual accounts payables 62 defining a batch, received from the customer. The domestic financial institution server 32 can copy and decrypt the captured accounts payable batch data file 42 in case the file is lost and for auditing or regulatory purposes. The accounts payable batch data file 42 can then be stored or held in the form of individual records in a database on the domestic financial institution server 32. In an embodiment of the present invention, the domestic financial institution server 32 can copy and store an archive record of the data file as received and can tag the copied file (block 146) with an accounts payable batch data file identifier 64 to provide for identification and tracking of the batch data file 42. As part of an audit trail, the tagging by a computer of the file allows for the auditor 100 to verify a match between the batch submission of each customer and the batch data file 42 received. When the accounts payable batch data file 42 is received by the domestic financial institution, and a batch number is assigned, the financial institution customer can be notified (block 148), typically through e-mail notification, web page hyperlink or other methodology (see FIG. 10) known by those skilled in the art.

An embodiment of the present invention, can include the step of aggregating by a computer (block 150) the plurality of individual accounts payables 62 within the batch data file 42 having specific payees and payment requirements to form an aggregate total of foreign currency needed 70. Preferably, the aggregate total 70 will include the payment requirements of any suspect records 82 defined as having transactional data failing to meet the preselected foreign financial transaction regulatory criteria. The customer is generally provided (block 152) and receives the batch number (block 148) along with the aggregate total of the currency needed 70 determined by the foreign exchange transaction determiner 68. Note, receipt of an aggregate amount by a customer (block 148) can occur alone or in combination with receipt of the (block 152) transfer of the aggregate total identified by batch number and the (block 146) confirmation of the batch number assigned to the accounts payable batch data file 42. The customer awaits the foreign exchange quote 48 based on the published aggregate amount 70 (block 154).

The aggregate total 70 is utilized by the foreign exchange transaction determiner 68 to perform the step of requesting (block 156) a foreign exchange quote 48 on the aggregate amount 70. The foreign exchange quote 48 can be requested either automatically or manually either through internal systems or through an external information service provider such as "Reuters," for example, or other service providers as understood by those skilled in the art. An embodiment of the present invention also includes the step of receiving (block 158) the foreign exchange quote 48 on the aggregate amount 70 and can include adding (block 160) a bank margin/spread, defined as financial institution transaction fees and costs and any foreign financial institution fees, preferably to the aggregate total 70 but alternatively to the individual accounts payables 62 to reflect an amount of funds required to process the accounts payable batch data file 42.

An embodiment of the present invention also includes the step of providing (block 162) a foreign exchange quote 48 that is received by the customer (block 164) based on the quote developed from the aggregate total 70 of the payment requirements of the accounts payable batch data file 42. The foreign exchange contract confirmer 72 receives a quote generally from an information service provider located externally to the domestic financial institution (block 158), but which can be located internally to the domestic financial institution. Preferably, the quote 48 includes the payment requirements of the suspect records 82 in the suspect record data file 136.

In an embodiment of the present invention, typically after aggregating by a computer payment requirements to form an aggregate total of foreign currency needed (block 150), a regulatory screener 66 screens (block 166) the accounts payable batch data file 42 for transactional data failing to meet preselected foreign financial transaction regulatory criteria (block 168). One example of a regulatory screener 66 includes a software product named "Tracker" provided by Bridger Systems, Inc. of Bozeman, Mont.

The suspect record identifier 80 can compare the accounts payable batch or batch data file 42 prior to regulatory screening to the accounts payable batch or batch data file 42 after regulatory screening. This will allow the domestic financial institution to identify and to tag (block 170) any record found to be a suspect record 82 within the accounts payable batch data file 42 with a suspicious record identifier 84 to track suspect record activity by the suspicious record identifier 84. The step of tracking suspect record activity (block 192), described below, by the suspicious record identifier 158 forms part of an audit trail. Where one of the plurality of individual accounts payables 62 of the accounts payable batch data file 42 is found to fail to meet the preselected regulatory criteria, the domestic financial institution can attempt either manually or automatically to resolve the deviation. Generally, however, the domestic financial institution must "hold" the accounts payable batch data file 42 and request and receive instructions (block 172) from one or more regulatory agencies such as the Office of Foreign Assets Control (OFAC). The instructions can be to proceed with processing, get further information from the financial institution customer, or hold all or part of the transaction for seizure. The regulatory screener 66 can withhold any suspect data transactions or record 82 from the post-screening accounts payable batch data file 42. This array of withheld suspect record(s) 82 thereby collectively define a suspect record data file 136.

As shown in FIGS. 6A, 6B, 7, and 14, the customer receives the foreign exchange quote 48 (block 164). The foreign exchange contract confirmer 72 awaits and then confirms (block 174) the customer desires to complete the transaction. Generally, prior to confirming the desire to complete the foreign exchange transaction, the customer can transmit source account information (block 176), can view the aggregate amount assigned the batch (see FIG. 11), and can access (block 178) the foreign exchange rate (see FIG. 12). The financial institution customer confirms (block 180) the desire to execute the foreign exchange by selecting an "Accept" type icon or button or "checking" a check box on the contract confirmation page 138 (see FIG. 13), or through use of other methodologies known by those skilled in the art. If the financial institution customer "accepts" the contract, the customer creates an approval of the foreign exchange contract and a paper confirmation typically prints on the domestic financial institution printer 122. The financial institution customer will then await (block 182) confirmation of payment of the plurality of individual accounts payables 62 within the accounts payable batch data file 42 and the return of a domestic financial institution reconciliation file 120 produced from a foreign financial institution reconciliation file 114.

The contract confirmer 72 receives either the acceptance or rejection of the contract (block 174). If rejected by the financial institution customer, the foreign exchange process is terminated. If accepted, the domestic financial institution generally decides whether or not to accept the contract and authorize the foreign exchange (block 184). If the domestic financial institution does not authorize the foreign exchange transaction, the domestic financial institution will notify the customer (block 186). If accepted, the domestic financial institution generally debits funds from the customer account to cover the quote 70 provided to the customer based on the aggregate amount of foreign currency 70 required to prosecute the accounts payable batch data file 42 (block 188).

In an embodiment of the present invention, if one of the plurality of individual accounts payables 62 of the accounts payable batch data file 42 is found to fail to meet the preselected regulatory criteria, as stated above, the domestic financial institution must "hold" the accounts payable batch data file 42 and request and receive instructions (block 172) from one or more regulatory agencies. Typically, it should then be ascertained (block 190) whether the foreign exchange of the entire batch data file 42 has been approved. Where a suspect record 82 has been identified, the decision includes the requirements of the regulatory body as understood by those skilled in the art. If no suspect record 82 is found in the batch data file 42, the trade can be executed (block 204) as desired, and as described below. If a suspect record 82 were found and both the domestic financial institution and the regulatory body approve the full foreign exchange on the entire batch data file 42, processing of the foreign exchange transaction can continue, but normally with the suspicious record identifier 84 utilized to track suspect record 82 activity by the suspicious record identifier 84 (block 192). If the complete transaction has not been approved, but a decision (block 194) to authorize a partial foreign transaction, excluding the suspect records 82, has been made, an embodiment of the present invention includes the step of separating and withholding the suspect data transactions from the post-screening accounts payable batch data file 42 (block 196) and proceeding with the foreign exchange for an aggregate including only the non-suspect records (block 198). Correspondingly, the domestic financial institution can then freeze funds associated with the withheld suspect data transactions (block 200), depending upon regulatory requirements. If neither the full foreign exchange transaction or partial foreign exchange transaction were approved, generally, the customer can be notified that no foreign exchange would be prosecuted (block 202), depending upon regulatory requirements.

In an embodiment of the present invention, a foreign exchange trade will be initiated to fund the payment requirements of the accounts payable batch data file 42 (block 204). Actual trade execution, in practice, may or may not occur before transmitting the batch data file 42 to the foreign financial institution. In an aspect of the present invention, a nostro account verifier (not shown) can determine whether the nostro account 78 contains funds sufficient to fund or cover the transaction related to the accounts payable batch data file 42. If the nostro account 78 has insufficient funds to cover the requested transaction or if no nostro account 78 exists, the step (block 204) can include authorizing a foreign exchange to fund or create the nostro account 78, typically through a foreign exchange computer associated with the domestic financial institution or an external foreign exchange transaction provider. As stated above, although in an embodiment of the present invention shown in FIGS. 5 and 6, the nostro account funding is temporally tied to the transmission of the accounts payable batch data file 42 of each individual customer, other timing methodologies as understood by those skilled in the art, generally related to improving foreign exchange rate spread are within the scope of the present invention as well. In other words, this step (block 204) can be conducted prior to approval of the foreign exchange transaction by the customer or even after final payment of the payment requirements in the accounts payable batch data file 42 by the foreign financial institution in order to capitalize on or await an anticipated improved foreign exchange rate. In either embodiment of the present invention, no delay in executing the foreign exchange to fund the nostro account 78, other than that required awaiting the wiring of foreign exchange funds (block 212), if desired, should be necessary if the financial institution customer has a pre-established account with the domestic financial institution sufficient to fund the aggregate requirements 70 of the accounts payable batch data file 42.

If the nostro account 78 is not sufficiently funded, the foreign financial institution will need to await the arrival of nostro account funding (block 212). If foreign currency funds are required, typically, the contract confirmer 72 or alternatively, the nostro account verifier can either internally or externally request a foreign exchange computer having foreign exchange trading software to execute a trade and transfer the funds, typically through a federal bank, earmarked for an account at the domestic financial institution such as a foreign currency account. The foreign exchange funds can correspondingly be transferred from the domestic financial institution to the foreign financial institution for funding the nostro account 78, though other routing methods known by those skilled in the art are within the scope of the invention. In an embodiment of the present invention, however, the foreign exchange funds to fund the nostro account 78, for example, can be transferred from the domestic financial institution by wire through a domestic federal bank, then to the foreign country central bank, and then to the foreign country local bank/financial institution prosecuting the accounts payable batch data file 42.

After the contract confirmer 72 or alternatively, the nostro account verifier requests a foreign exchange trade from the foreign exchange computer, the domestic financial institution server 32 should receive (block 208) notification by the foreign exchange computer of a completed foreign exchange transaction. The foreign exchange transaction transferor 74 will then typically await (block 210) the transfer of funds necessary to fund the nostro account 78. Either before, during, or after the contract confirmer 72 or nostro account verifier requests a foreign exchange trade, the foreign exchange transaction transferor 74, responsive to the foreign exchange contract confirmer 72 and/or nostro account verifier can initiate the formatting and encryption of the accounts payable batch data file 42 (block 206). This step generally includes alone or in combination, a formatter 88, responsive to either the foreign exchange contract confirmer 72 or the transaction transferor 74 for converting the accounts payable batch data file 42 to a predetermined format specified by the foreign financial institution, and an encryptor 90 for encrypting the accounts payable batch data file for transmission to the foreign financial institution computer 50. This step can be accomplished, however, at any time prior to actual transmission of the accounts payable batch data file 42 to the foreign financial institution (block 214) and therefore can alternatively be combined in the batch file transmission step (block 214).

In an embodiment of the present invention, upon receipt of the foreign exchange funds (block 212), the foreign exchange transaction transferor 74 can initiate transfer, generally by wire, of any funds necessary to fund the nostro account 78 and initiate transfer of the accounts payable batch data file 42, generally over the area network 38, to the foreign financial institution site for payment of the plurality of individual accounts payables 62 (block 214). This step includes a security protocol generator 92 which generates a security protocol and transmits the accounts payable batch data file 42 from the domestic financial institution server 32, through the area network 38, to the foreign financial institution computer 50 associated with the foreign financial institution site using the security protocol 94 specified by the foreign financial institution. As described above, in the step of transmitting the accounts payable batch data file 42, the implementation of the formatter 88, encryptor 90, and security protocol generator 92 can be combined in one step or in one functional software module. After a transmission of the accounts payable batch data file 42 and the wire of the foreign exchange funds, as desired, the domestic financial institution auditor 100 awaits (block 228) notification of payment completion and a reconciliation file 114 from the foreign financial institution. Although separately, the wiring of funds, if needed, preferably occurs prior to or simultaneous with the transfer of the batch data file 42 so that the foreign financial institution will quickly or immediately have access to funds to proceed with instructions provided in the data file 42.

The foreign financial institution computer 50 positioned at the foreign financial institution site and in communication with the domestic financial institution server 32 through the area network 38 receives (block 216) the accounts payable batch data file 42, and the nostro account funding, generally by wire, if required. The foreign financial institution, for example, can be provided a maximum amount of time, e.g., 48 hours, to finalize payments, thus advantageously reducing the potential foreign currency investment risk. Upon receipt of the nostro account funding and batch data file 42, the foreign financial institution computer 50 can send a confirmation of receipt to the domestic financial institution server 32.

The foreign financial institution computer 50 also can have foreign exchange accounts payable processing software 52 to process the accounts payable batch data file 42 having a plurality of specific payees 106 and a respective plurality of amounts 108 to be distributed by the foreign financial institution from the nostro account to each of the plurality of specific payees. The foreign financial institution computer 50 extracts (block 218) each accounts payable within the accounts payable batch data file 42 not meeting the requirements of the foreign financial institution or having incorrect data, defining an individual accounts payable error 118. Each individual accounts payable 62 containing the individual accounts payable error 118 is extracted for return to the domestic financial institution server 32 and for eventual correction and re-submission by the second customer computer 40. The individual accounts payable error 118 is generally either returned in a separate error record file 119 or in the reconciliation file 114. The foreign financial institution computer 50 tracks and stores (block 220) the monetary transactions of the nostro account 78 using a foreign exchange tracker 110 during this step of paying or crediting (block 222) the plurality of specific payees 106. The payment of the plurality of specific payees 106 is generally accomplished through transferring funds to local foreign accounts of the payees, through checks, or through other methodologies as known by those skilled in the art.

In an embodiment of the present invention, upon completion of this step of paying and crediting (block 222) the plurality of specific payees 106, an accounts payable batch data file reconciler 112 compiles and generates (block 224) a reconciliation file 114. The reconciliation file 114 can include transaction confirmation and the individual accounts payable errors 118 from the error record file 119. After encryption, a security protocol generator 116 of the foreign exchange accounts payable processing software 52 transmits (block 226) the reconciliation file 114 through the area network 38 to the domestic financial institution server 32.

A foreign exchange transaction auditor 100 of the foreign exchange analyzing software 34 on the domestic financial institution server 32, directly or indirectly, receives the reconciliation file (block 230) through the area network 38 from the foreign exchange accounts payable processing software 52. The foreign change transaction auditor 100 functions to audit (block 232) the reconciliation file 114 for a possibility of an error and to modify the reconciliation file 114. In another embodiment of the present invention, the auditor 100 reconciles dataflow activity of the reconciliation file 114 as a combination of the plurality of individual accounts payables 62 to thereby define a batch basis reconciliation file 120. The auditor 100 also can perform the sub-step of auditing the reconciliation file 114 to confirm the post-screening accounts payable batch data file aggregate amount 70 "requirements" match funding and associated activity of the nostro account 78, to verify that the inter-bank funding is conducted according to the domestic financial institution standards, generally known by those skilled in the art. The auditor 100 can audit the reconciliation file 114 to confirm the post-screening accounts payable batch data file 42 payment requirements match respective nostro account 78 payment activity by the foreign financial institution to verify what was required to be paid, was paid. The auditor 100 can also perform the sub-step of auditing the reconciliation file 114 to confirm the pre-screening accounts payable batch file 42 payment requirements match respective nostro account 78 payment activity by the foreign financial institution to reconcile batch activity to the financial activity. The foreign exchange transaction auditor 100 can add a bank margin (financial institution fees and costs) to the individual accounts payables 62 or to the aggregate amount 70 (block 234), and prompt transfer of the reconciliation file 120 (block 236) to the second customer computer 40. The transfer is best accomplished by the formatter 88 in the foreign exchange analyzing software 36 first formatting the reconciliation file 120 to the format utilized by the customer to transmit the accounts payable batch data file, the encryptor 90 encrypting the file, and security protocol generator 92 transmitting the file 120 over the area network 38 to the customer computer 40.

The financial institution customer receives confirmation of payment and the reconciliation file 120 (block 238). The reconciliation file 120 is transmitted to the second customer computer 40 for review and reconciliation of dataflow activity of the reconciliation file 120 by each of a respective plurality of amounts actually transferred 108 to each of the plurality of specific payees 106 of the plurality of individual accounts payables 62, to reconcile the reconciliation file 120 (block 240) at the payment level basis and for possible correction and re-submission of an individual accounts payables 62 containing the individual accounts payable error 118 in a new accounts payable batch data file 42.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the attached claims.

That claimed is:

1. A system for facilitating payment of accounts payables from a foreign financial institution for a customer of a domestic financial institution, the system comprising:

a first financial institution computer positioned at a domestic financial institution site to define a domestic financial institution server, the domestic financial institution server having memory associated therewith, the memory being a tangible, computer-readable storage medium;

foreign exchange analyzing computer program product stored in the memory of the domestic financial institution server as a set of instructions executable on the domestic financial institution server to analyze a foreign exchange transaction, the foreign exchange analyzing program product including:

an accounts payable batch identifier positioned to tag an accounts payable batch data file having a plurality of individual accounts payables received from a customer with a batch data file identifier, the accounts payable batch data file being defined by the plurality of individual accounts payables collected as a collective group so that the plurality of accounts payables is positioned to be further processed simultaneously and collectively, a regulatory screener positioned to receive the tagged accounts payable batch data file, having a preselected regulatory criteria associated with a foreign financial transaction, and positioned to screen the accounts payable batch data file for any transactional data of the collective group of the plurality of accounts payables failing to meet the preselected regulatory criteria, a foreign exchange transaction determiner positioned to receive the tagged accounts payable batch data file to determine an aggregate amount of foreign currency desired by the customer to pay an aggregate of the collective group of the plurality of individual accounts payables in the accounts payable batch data file and to request a foreign exchange quote on the aggregate amount, a foreign exchange contract confirmer positioned to receive the foreign exchange quote on the aggregate amount and to confirm that the customer desires to complete a foreign exchange based on the foreign exchange quote, and a foreign exchange transaction transferor responsive to the foreign exchange contract confirmer to initiate transfer of foreign currency funds of a selected foreign currency into a nostro account associated with the foreign financial institution and to transfer the accounts payable batch data file to the foreign financial institution for payment of the plurality of individual accounts payables with the aggregate amount of foreign currency;

an area network in communication with the server; and a second customer computer in communication with the area network, positioned remote from the server at a customer site, and positioned to transmit the accounts payable batch data file to the foreign exchange analyzing program product stored on the server.

2. A system as defined in claim 1, wherein the foreign exchange analyzing program product further includes:

a suspect record identifier positioned to compare the accounts payable batch data file prior to regulatory screening by the regulatory screener to a version of the accounts payable batch data file after regulatory screening by the regulatory screener to identify and tag each suspect record within the accounts payable batch data file with a suspicious record identifier to track suspect record activity by the suspicious record identifier.

3. A system as defined in claim 1, further comprising:

foreign exchange quoting computer program product stored in the memory of the domestic financial institution server and responsive to the foreign exchange transaction determiner to provide a foreign exchange quote to the foreign exchange transaction determiner;

wherein the foreign exchange transaction determiner further requests a foreign exchange quote on the aggregate amount of foreign currency by conveying foreign currency needs to the foreign exchange quoting program product; and wherein the foreign exchange contract confirmer further notifies, through the area network, the second customer computer of a pending contractual transaction for approval by the customer.

4. A system as defined in claim 1, wherein the foreign exchange analyzing program product further includes:

a formatter positioned to convert the accounts payable batch data file to a predetermined format specified by a foreign financial institution;

an encryptor positioned to encrypt the accounts payable batch data file for transmission to a foreign financial institution computer positioned at a foreign financial institution site in communication with the area network and positioned remote from the domestic financial institution server; and a security protocol generator positioned to generate a security protocol and to transmit the accounts payable batch data file from the domestic financial institution server, the accounts payable batch data file being separately transmitted from the transfer of foreign currency funds into the nostro account.

5. A system as defined in claim 4, wherein each of the plurality of individual accounts payables of the accounts payable batch data file includes an accounts payable record; and wherein the accounts payable batch data file has a plurality of accounts payable records, one of the plurality of accounts payable records being screened from the accounts payable batch data file by the regulatory screener and identified as having transactional data failing to meet the preselected regulatory criteria of the regulatory screener to define a suspect transaction, the suspect transaction being withheld from the accounts payable batch data file to be transferred to the foreign financial institution computer.

6. A system as defined in claim 1, wherein the foreign exchange analyzing program product is positioned in communication through the area network with foreign exchange accounts payable processing computer program product positioned to audit and store monetary transactions of the nostro account and stored in memory of a foreign financial institution computer located at a foreign financial institution site, and wherein the foreign exchange analyzing program product further includes:

a foreign exchange transaction auditor positioned to match the accounts payable batch data file aggregate amount with an amount of foreign currency funds transferred to the nostro account, positioned to match the screened accounts payable batch data file payment requirements with nostro account payment activity by the foreign financial institution, and positioned to compare the unscreened accounts payable batch data file payment requirements with nostro account payment activity by the foreign financial institution.

7. A system as defined in claim 1, wherein the domestic financial institution server is in communication, through the area network, with foreign financial institution computer having memory associated therewith and having a foreign exchange accounts payable processing computer program product stored therein, positioned at a foreign financial institution site remote from the domestic financial institution server, in communication with the domestic financial institution through the area network, and positioned to receive the accounts payable batch data file from the domestic financial institution server through the area network, to process an accounts payable batch data file.

8. A system as defined in claim 7, wherein the accounts payable batch data file further includes a plurality of specific payees, and a respective plurality of amounts to be distributed by the foreign financial institution from the nostro account to each of the plurality of specific payees, and wherein the foreign exchange accounts payable processing program product on the foreign financial institution computer includes a foreign exchange tracker positioned to track a foreign exchange transaction and an accounts payable batch data file reconciler positioned to compile a reconciliation file, the reconciliation file including relational data to display a relation between the plurality of specific payees of the accounts payable batch data file, a respective plurality of foreign currency amounts to be transferred to each of the plurality of specific payees of the accounts payable batch data file, and a respective plurality of foreign currency amounts actually transferred to each of the plurality of specific payees.

9. A system as defined in claim 8, wherein the foreign exchange accounts payable processing program product on the foreign financial institution computer further includes an accounts payable batch data file reconciler positioned to compile a reconciliation file, the reconciliation file including a plurality of individual accounts payables extracted from within the accounts payable batch data file transferred by the foreign exchange transaction transferor on the domestic financial institution server to the foreign financial institution computer, and a security protocol generator to transmit the reconciliation file through the area network to the domestic financial institution server, and wherein the foreign exchange analyzing program product on the domestic financial institution server further includes:

a foreign exchange transaction auditor positioned to receive the reconciliation file from the accounts payable batch data file reconciler of the foreign exchange accounts payable processing program product through the area network to audit the reconciliation file for a possibility of an error, to modify the reconciliation file to add a bank margin to the aggregate amount of foreign currency utilized to fund the individual accounts payables, and to transmit the reconciliation file to the second customer computer.

10. The system as defined in claim 1, wherein the foreign exchange analyzing program product stored on the domestic financial institution server is configured to receive a reconciliation file containing a plurality of individual accounts payables;

wherein at least one of the plurality of individual accounts payables of the reconciliation file contains incorrect information, to thereby define an individual accounts payable error;

wherein the foreign exchange analyzing program product is further configured to return at least one of the plurality of individual accounts payables containing the individual accounts payable error for correction and re-submission by the second customer computer to the foreign exchange analyzing program product; and wherein the at least one of the plurality of individual accounts payables containing the individual accounts payable error is stored on the second customer computer in a new accounts payable batch data file prior to resubmission by the second customer computer to the foreign exchange analyzing program product stored on the domestic financial institution server.

11. A system as defined in claim 1, wherein the foreign exchange analyzing program product further includes a foreign exchange transaction auditor positioned to receive a reconciliation file from the foreign financial institution computer through the area network to audit the reconciliation file for a possibility of an error and to modify the reconciliation file to add a bank margin to the aggregate amount of foreign currency utilized to fund the individual accounts payables in the accounts payable batch data file, the reconciliation file including relational data to display a relation between the plurality of specific payees of the accounts payable batch data file, a respective plurality of foreign currency amounts to be transferred to each of the plurality of specific payees of the accounts payable batch data file, and a respective plurality of foreign currency amounts actually transferred to each of the plurality of specific payees;

wherein the foreign exchange transaction auditor on the domestic financial institution server is further positioned to reconcile dataflow activity of the reconciliation file as a combination of the plurality of individual accounts payables to thereby define a batch basis reconciliation file; and wherein the foreign exchange transaction auditor on the domestic financial institution server is further positioned to transfer the batch basis reconciliation file to the second customer computer after the batch basis reconciliation occurs at the domestic financial institution, the batch basis reconciliation file being in a format whereby the customer reconciles dataflow activity of the batch basis reconciliation file by each of a respective plurality of amounts actually transferred to each of the plurality of specific payees of the plurality of individual accounts payable.

12. A computer-implemented method for facilitating payments for a customer through a foreign financial institution using a batch payment process, the method comprising the steps of:

receiving an accounts payable batch data file being defined by a plurality of accounts payables collected as a collective group; and collectively and simultaneously processing the accounts payable batch data file, the processing including the steps of:

tagging by a computer an accounts payable batch data file having a plurality of individual accounts payables received from a customer with an accounts payable batch data file identifier, screening the accounts payable batch data file for transactional data failing to meet preselected regulatory criteria associated with a foreign financial transaction to thereby define a post-screening accounts payable batch data file, comparing the accounts payable batch data file prior to regulatory screening to a post-screening accounts payable batch data file to identify each individual accounts payable failing to meet the preselected regulatory criteria defining a suspect record, tagging by a computer each suspect record within the post-screening accounts payable batch data file with a suspicious record identifier to track suspect record activity by the suspicious record identifier, and tracking suspect record activity by the suspicious record identifier, the steps of tagging by a computer the accounts payable batch data file, screening the accounts payable batch data file, comparing the accounts payable batch data file, tagging by a computer each suspect record, and tracking suspect record activity being performed by a computer associated with a domestic financial institution.

13. A computer-implemented method for facilitating payments for a customer through a foreign financial institution using a batch payment process, the method comprising the steps of:

aggregating, by a computer, payment requirements of a plurality of individual accounts payables collected as a collective group in a pre-screening accounts payable batch data file prior to regulatory screening to form an aggregate total of payment requirements for a plurality of individual accounts payables, whereby the aggregate total of payment requirements for a plurality of individual accounts payables indicates the foreign currency needed to fund the total payment requirements of a customer for a transaction period;

collectively and simultaneously processing the pre-screening accounts payable batch data file, the processing including the steps of:

adding financial institution foreign exchange transaction fees and costs, defining a bank margin, to a first foreign exchange quote on the aggregate total for a plurality of individual accounts payables to obtain a second foreign exchange quote to provide to the customer, confirming the customer desires to complete a foreign exchange based on the second foreign exchange quote, and performing the foreign exchange responsive to the confirmation;

the steps of aggregating, by a computer, payment requirements, adding a bank margin, confirming the customer desires to complete a foreign exchange, and performing the foreign exchange being performed by a computer associated with a domestic financial institution.

14. A method as defined in claim 13, further comprising the step of:

sending a post-screening version of the accounts payable batch data file over a communication network to a destination foreign financial institution on anticipation of availability of foreign exchange funds.

* * * * *